(12) United States Patent
Nordin et al.

(10) Patent No.: US 11,871,322 B2
(45) Date of Patent: Jan. 9, 2024

(54) INSTALLATION OF HYGIENE EQUIPMENT

(71) Applicant: Essity Hygiene and Health Aktiebolag, Gothenburg (SE)

(72) Inventors: Magnus Nordin, Gothenburg (SE); Jonas Kuylenstierna, Gothenburg (SE); Annie Sporre Thorburn, Ellos (SE); Hakan Lindstrom, Gothenburg (SE); Gunilla Himmelmann, Gothenburg (SE); Robert Kling, Gothenburg (SE)

(73) Assignee: ESSITY HYGIENE AND HEALTH AKTIEBOLAG, Gothenburg (SE)

(*) Notice: Subject to any disclaimer, the term of this patent is extended or adjusted under 35 U.S.C. 154(b) by 0 days.

(21) Appl. No.: 17/312,433

(22) PCT Filed: Dec. 21, 2018

(86) PCT No.: PCT/EP2018/086610
§ 371 (c)(1),
(2) Date: Jun. 10, 2021

(87) PCT Pub. No.: WO2020/126038
PCT Pub. Date: Jun. 25, 2020

(65) Prior Publication Data
US 2022/0030404 A1    Jan. 27, 2022

(51) Int. Cl.
*H04W 4/80* (2018.01)
*H04W 4/38* (2018.01)
*H04W 4/029* (2018.01)

(52) U.S. Cl.
CPC ............. *H04W 4/80* (2018.02); *H04W 4/029* (2018.02); *H04W 4/38* (2018.02)

(58) Field of Classification Search
CPC .......... H04W 4/80; H04W 4/38; H04W 4/029
See application file for complete search history.

(56) References Cited

U.S. PATENT DOCUMENTS 6,727,818 B1 * 4/2004 Wildman ............... G16H 40/20
340/567
7,726,599 B2   6/2010 Lewis et al.
(Continued)

FOREIGN PATENT DOCUMENTS

CN        1901829 A     1/2007
CN      101080190 A    11/2007
(Continued)

OTHER PUBLICATIONS

European Patent Office, International Search Report and Written Opinion of the International Searching Authority, International Application No. PCT/EP2018/086610, dated Sep. 24, 2019 (14 pages).
(Continued)

*Primary Examiner* — David Bilodeau
(74) *Attorney, Agent, or Firm* — CANTOR COLBURN LLP

(57) ABSTRACT

A method, for a mobile computing device, of installing a sensor device, the method including the steps of obtaining, from the sensor device, information indicative of an identification of the sensor device; obtaining information indicative of a location of a piece of hygiene equipment with which the sensor device is to be associated; and associating the information indicative of an identification of the sensor device with the information indicative of a location of the piece of hygiene equipment.

35 Claims, 9 Drawing Sheets

(56) References Cited

U.S. PATENT DOCUMENTS

| | | | |
|---|---|---|---|
| 8,237,558 B2* | 8/2012 | Seyed Momen | G08B 21/245 |
| | | | 340/286.07 |
| 8,587,437 B2* | 11/2013 | Kyle | G16H 40/67 |
| | | | 340/573.1 |
| 9,604,811 B2 | 3/2017 | Case et al. | |
| 9,836,950 B2* | 12/2017 | Levchenko | G07C 9/28 |
| 9,886,810 B1* | 2/2018 | Murphy | G07F 9/006 |
| 9,892,372 B2 | 2/2018 | Himmelmann et al. | |
| 10,223,554 B2 | 3/2019 | Brandsma et al. | |
| 10,373,477 B1* | 8/2019 | Bonner | A47K 5/12 |
| 10,524,621 B2* | 1/2020 | Ophardt | A47K 5/1217 |
| 2002/0175182 A1 | 11/2002 | Matthews | |
| 2008/0103636 A1* | 5/2008 | Glenn | G16H 40/20 |
| | | | 705/1.1 |
| 2009/0195385 A1 | 8/2009 | Huang et al. | |
| 2010/0173581 A1* | 7/2010 | Dolan | G07C 11/00 |
| | | | 455/39 |
| 2012/0218106 A1* | 8/2012 | Zaima | G16H 40/63 |
| | | | 340/540 |
| 2015/0199883 A1* | 7/2015 | Hartley | A47K 5/1217 |
| | | | 340/686.6 |
| 2016/0140831 A1* | 5/2016 | Hermann | G08B 21/245 |
| | | | 340/573.1 |
| 2016/0364685 A1 | 12/2016 | Wass et al. | |
| 2017/0098366 A1* | 4/2017 | Hood | G16H 40/20 |
| 2018/0293873 A1 | 10/2018 | Liu et al. | |
| 2021/0174665 A1* | 6/2021 | Shoari | G08B 21/245 |

FOREIGN PATENT DOCUMENTS

| | | |
|---|---|---|
| CN | 103136497 A | 6/2013 |
| CN | 104188587 A | 12/2014 |
| CN | 104603805 A | 5/2015 |
| CN | 105593149 A | 5/2016 |
| CN | 105960653 A | 9/2016 |
| WO | 2018103847 A1 | 6/2018 |
| WO | 2019045745 A1 | 3/2019 |
| WO | 2019055024 A1 | 3/2019 |

OTHER PUBLICATIONS

Office Action issued in Chinese Patent Application No. 201880100279.7; Application Filing Date Dec. 21, 2018; dated Aug. 10, 2022 (24 pages).

Office Action issued in Chinese Patent Application No. 201880100279.7; Application Filing Date Dec. 21, 2018; dated Dec. 16, 2022 (20 pages).

Office Action issued in Chinese Patent Application No. 201880100279.7; Application Filing Date Dec. 21, 2018; dated Mar. 13, 2023 (19 pages).

Office Action issued in Chinese Patent Application No. 201880100279.7; Application Filing Date Dec. 21, 2018; dated Mar. 11, 2022 (24 pages).

* cited by examiner

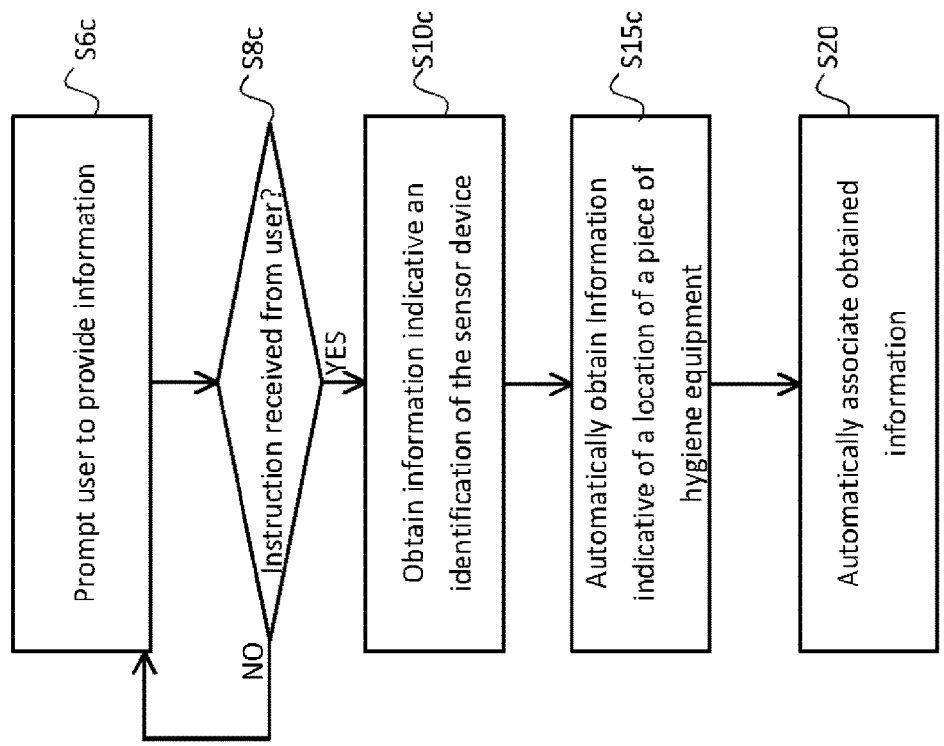
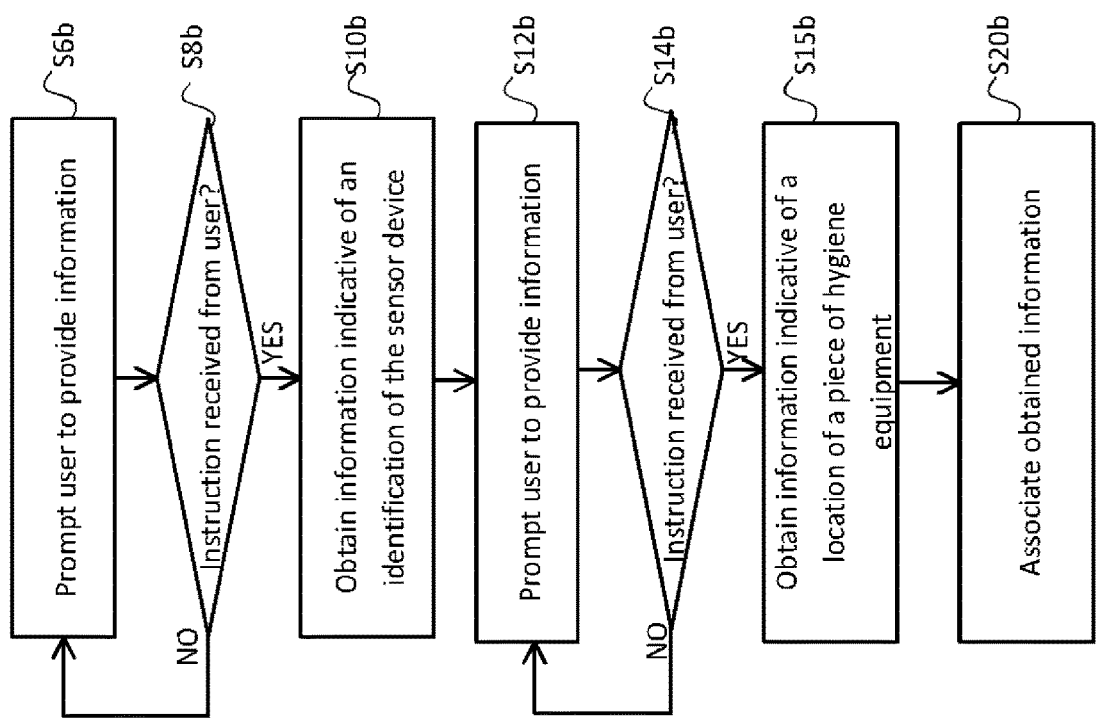

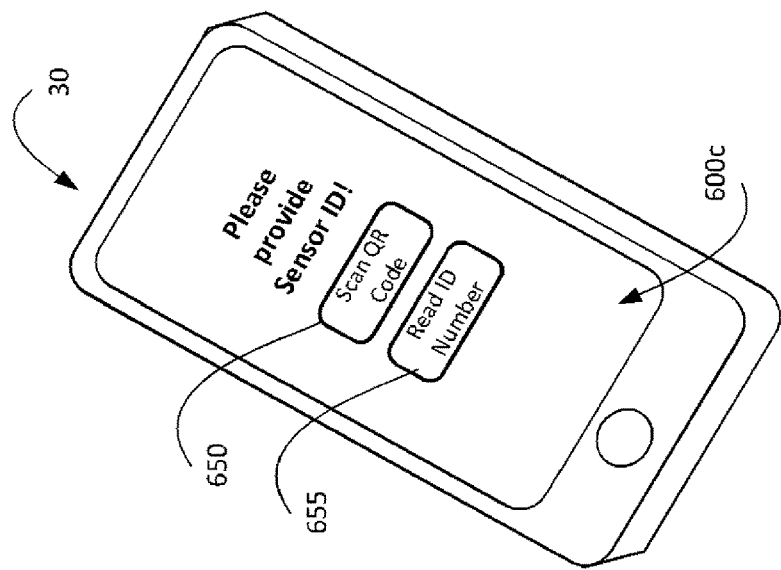
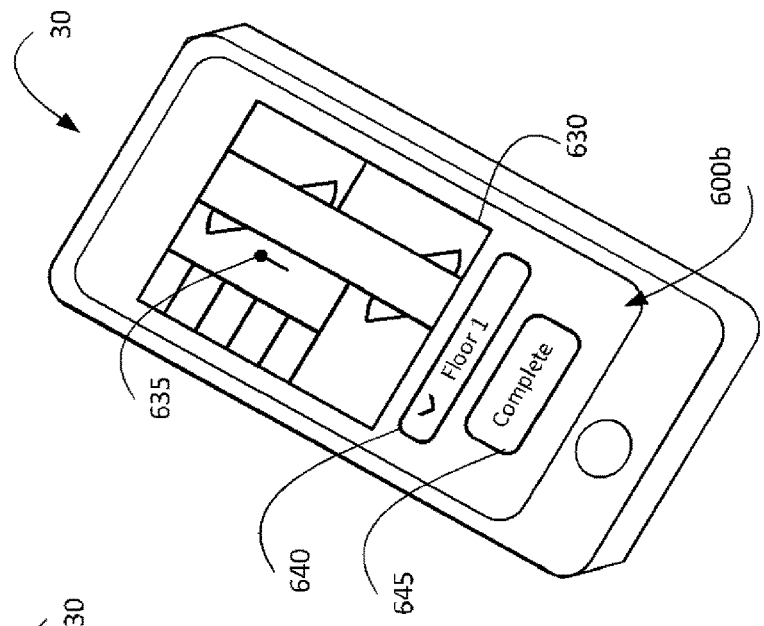
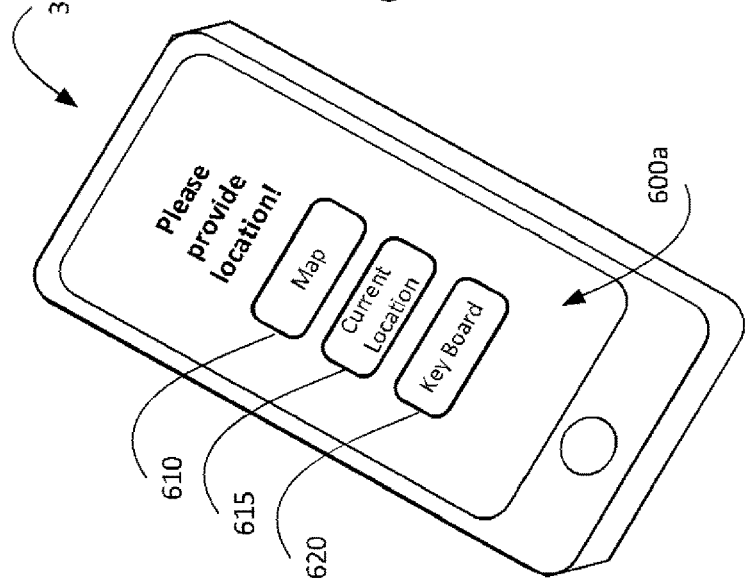

INSTALLATION OF HYGIENE EQUIPMENT

CROSS REFERENCE TO RELATED APPLICATION

The present application is a U.S. National Stage entry under 35 U.S.C. § 371 of, and claims priority to, International Application No. PCT/EP2018/086610, filed Dec. 21, 2018, the disclosure of which is hereby incorporated herein by reference in its entirety.

FIELD OF THE INVENTION

The present invention relates to hygiene equipment and to setting up and configuring individual pieces of hygiene equipment. More specifically, the present invention relates to a sensor device mounted on a piece of hygiene equipment, that can be arranged to dispense a consumable to a user or to dispose of a consumable from a user, and to setting up and configuring said sensor device using a mobile computing device.

BACKGROUND OF THE INVENTION

Hygiene equipment in the form of, for example, dispensers for various liquids and/or tissues, is generally common today in premises that are frequented by many people. Specifically, such premises can be office buildings, manufacturing sites, hospitals, airports, train stations, bus terminals, shopping malls, hotels, restaurants, schools, kindergartens, and the like, which all have in common that they are places being visited by a considerable number of people and that hand or body hygiene or cleaning in general is desired at least to some degree. As a consequence, these premises will provide restroom or related facilities for the people working or staying in these premises.

In such facilities, the described hygiene equipment may be installed in form of soap, foam or towel dispensers, disinfectant (e.g., alcogel, etc.) dispensers, toilet paper dispensers, hygiene bag dispensers, dispensers for hygiene products, such as absorbent articles, diapers, incontinence products, and other related devices. Additionally, hygiene equipment may be provided in the form of "non-dispensing" pieces of hygiene equipment such as data collection devices (for example, door passage sensors and people counters), provided in wash rooms or the like, which may provide indication of when cleaning or another maintenance action needs to be carried out by service personnel or in the form of "disposing" pieces of hygiene equipment, such as a waste paper bin, which dispose of consumables from one or more users. Usually, such hygiene equipment is predominantly present in restroom or toilet facilities. Likewise, such equipment may be found in entrance halls, kitchens, kitchenettes, offices, restaurants, canteens, conference/meeting rooms, receptions, reception areas, elevator, waiting areas, printer rooms and docucenters, gyms, or disposal areas. In the case of a hospital, for example, hygiene equipment will be present virtually everywhere, since doctors and caring personnel will need access to such facilities also when not using a restroom or toilet facility. Specifically, there may be rules and schemes that prescribe the use of hygiene equipment whenever entering some dedicated area, when approaching a patient, or, generally, before carrying out any tasks that require respective hygiene.

It is known in the arts to provide hygiene equipment in the form of dispensers having sensors which can detect that a given supply is about to run out or has run empty. The result of this detection can be made visible on the dispenser so that service personnel can take notice of a necessity to refill the dispenser. Likewise, it is known to provide such hygiene equipment or the sensor device with electronic capabilities for not only detecting the necessity of a refill, but also for conveying information on such a necessity for a refill to a somewhat central location.

For example, a server of, or, connected to a data network (e.g., Internet) can receive and store such notifications in order for allowing service personnel to receive or obtain corresponding indications that a refill needs to be carried out. In this case, the hygiene equipment may have capabilities to convey signals related to said notification via a wireless radio signal to a recipient station placed sufficiently near to the hygiene equipment or to a central server.

It is furthermore common that in the above described use cases of hospitals and the like there will be oftentimes a considerable number of individual pieces of hygiene equipment. Specifically, large facilities, such as, for example, a hospital, airport, or a hotel will have a considerable number of rooms and associated restrooms, and, consequently, the number of individual pieces of hygiene equipment will oftentimes reach tens, hundreds, or even thousands. At the same time, however, the hygiene equipment should employ its sensing and communication capabilities in a sensible manner so that—amongst others—each individual piece of hygiene equipment can detect that its supply of consumable runs empty and can report the corresponding need for a refill to some kind of central entity (such as, for example, a central server), which, in turn, can schedule a refill by sending personnel to the desired location. In other words, the personnel will need to know what to bring where in order to fulfil the refill request.

At this time, it becomes clear that there should be some knowledge on where a piece of hygiene equipment is installed and what identification it has or of what type it is, so that the described suitable refill can be sent to the correct location. For example, according to conventional practice, in order to set up and configure a dispenser (or other type of hygiene equipment) having a sensor device that can detect that a given supply is about to run out or has run empty, an installation worker must mount a sensor device on the dispenser, which is generally mounted on a wall. In order for the sensor device to provide useful data, it is necessary to determine an identification of the sensor device and a location of the dispenser with which the sensor device is to be associated. This location may be, for example, a floor of a building or a room of a building, a cubicle, a particular dispenser of a plurality of dispensers in a room or on a floor, a position of a dispenser in a 3D or 2D coordinate system, etc.

In order to manage this, each sensor is equipped with a small label having printed thereon a unique ID. The installation worker reads this label and types the number into a computer application running on a tablet or another mobile computing device in order to associate the sensor device with the dispenser on which it is mounted.

SUMMARY OF THE INVENTION

Although the prior arts provide for hygiene equipment that is able to (wirelessly) report the need of a refill and its respective identification information, the information on configuring the installation, including but not limited to naming each dispenser and sensor device, defining, describing and assigning a location to each dispenser and setting up manageable and logical structures within software, still needs to be obtained by tedious manual configuration with so far only limited support from automated systems. These deficits in the prior arts become perhaps most imminent when the individual pieces of hygiene equipment are spread over a large physical area (such as, for example, in an amusement park or airport) and/or when the number of individual pieces of hygiene equipment becomes large, e.g., reaches or is above fifty, one hundred, etc.

Furthermore, the present inventors have recognized that, as the sensor devices in question are generally very small, the labels provided thereon and the digits of the unique ID printed on the label are very small as well. Furthermore, such unique IDs tend to comprise relatively long numbers (for example, eight digits or more, ten digits or more, twenty digits or more, etc.). As a consequence, it is easy for the installation worker to type the wrong digits into an application during installation, particularly as the installation worker may install many sensor devices in a day. Such errors can, in turn, cause issues including a need to identify which sensor device(s) were not installed correctly and a need to fix the installation. Furthermore, the conventional approach as described above may be time-consuming and laborious for the installation worker.

It is therefore an aspect of the present invention to provide a solution that can substantially facilitate the setting up and installation of hygiene equipment and their respective sensor devices, even when the number of individual pieces to be installed becomes large. In some sense, it is a further aspect of the present invention to provide a method for a mobile computing device that automatically sets up and configures a sensor device mounted on a piece of hygiene equipment. It is a further aspect of the present invention to provide a method for a sensor device mounted on a piece of hygiene equipment to set up and configure itself automatically. Embodiments of the present invention may address one or more of these aspects.

According to one embodiment of the present invention, there is therefore provided a method, for a mobile computing device, of installing a sensor device. The method comprises the steps of obtaining, from the sensor device, information indicative an identification of the sensor device; obtaining information indicative of a location of a piece of hygiene equipment with which the sensor device is to be associated; and associating the information indicative of an identification of the sensor device with the information indicative of a location of the piece of hygiene equipment.

The present invention also provides a computer program comprising instructions, which, when executed by a mobile computing device, cause the mobile computing device to perform the method as set out above.

The present invention also provides a mobile computing device comprising a radio circuit, a processor, and a memory. The memory is configured to store instructions which, when executed by the processor, cause the processor to obtain, from a sensor device, information indicative an identification of the sensor device; obtain information indicative of a location of a piece of hygiene equipment with which the sensor device is to be associated; and associate the information indicative of an identification of the sensor device with the information indicative of a location of the piece of hygiene equipment.

The present invention also provides a method of automatically installing a sensor device. The method comprises the steps, performed by the sensor device of receiving, from a mobile computing device, security information for use in accessing a communication network; obtaining information indicative of a location of a piece of hygiene equipment with which the sensor device is to be associated; and transmitting, to a central server device via the communication network, information indicative of an identification of the sensor device in combination with the information indicative of a location of the piece of hygiene equipment.

The present invention also provides a sensor device comprising a sensor, a radio circuit, a processor, and a memory. The memory is configured to store instructions which, when executed by the processor, cause the processor to receive, from a mobile computing device, security information for use in accessing a communication network; obtain information indicative of a location of a piece of hygiene equipment with which the sensor device is to be associated; and transmit, to a central server device via the communication network, information indicative of an identification of the sensor device in combination with the information indicative of a location of the piece of hygiene equipment.

BRIEF DESCRIPTION OF THE DRAWINGS

Embodiments of the present invention, which are presented for better understanding the inventive concepts and which are not to be seen as limiting the present invention, will now be described with reference to the figures in which:

FIGS. 4(a) to 4(c) show flow diagrams illustrating processes for installing a sensor device, in accordance with an exemplary embodiment herein;

FIGS. 6(a) to 6(e) show schematic illustrations of a graphical user interface displayed on the display unit of the mobile computing device, in accordance with an exemplary embodiment herein;

DETAILED DESCRIPTION OF THE INVENTION

Figure 2:
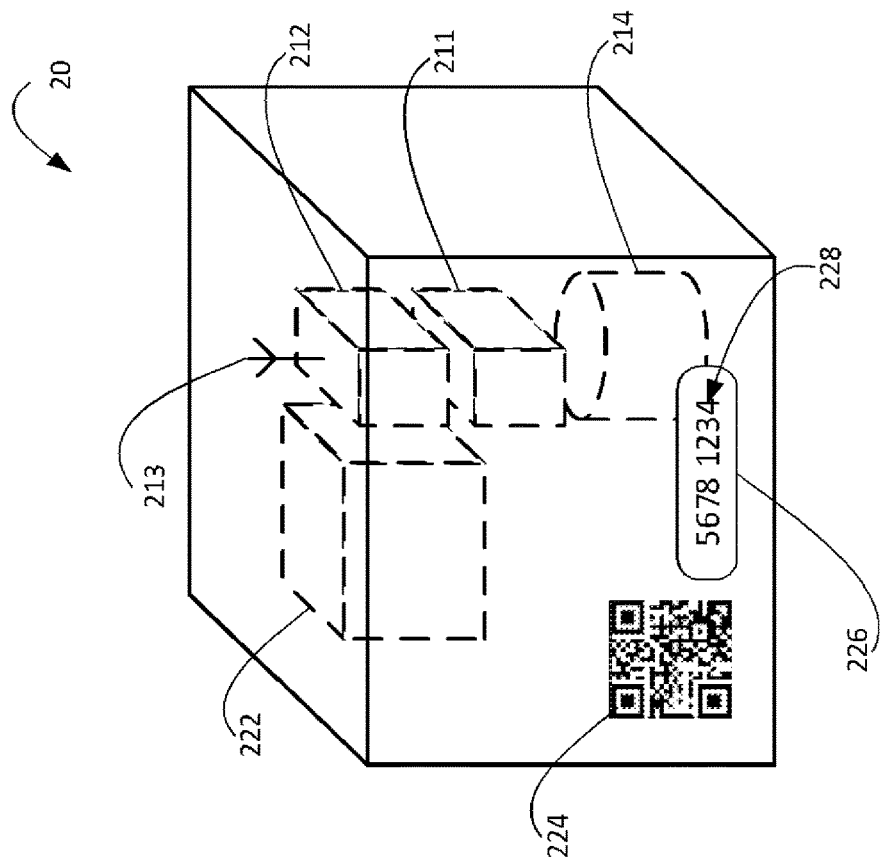
FIG. 2 shows a schematic view of a sensor device in accordance with an exemplary embodiment herein.

Embodiments of the present invention will now be described in detail with reference to the accompanying drawings. Like reference numerals appearing in different ones of the figures can denote identical or functionally similar elements, unless indicated otherwise.

Figure 1:
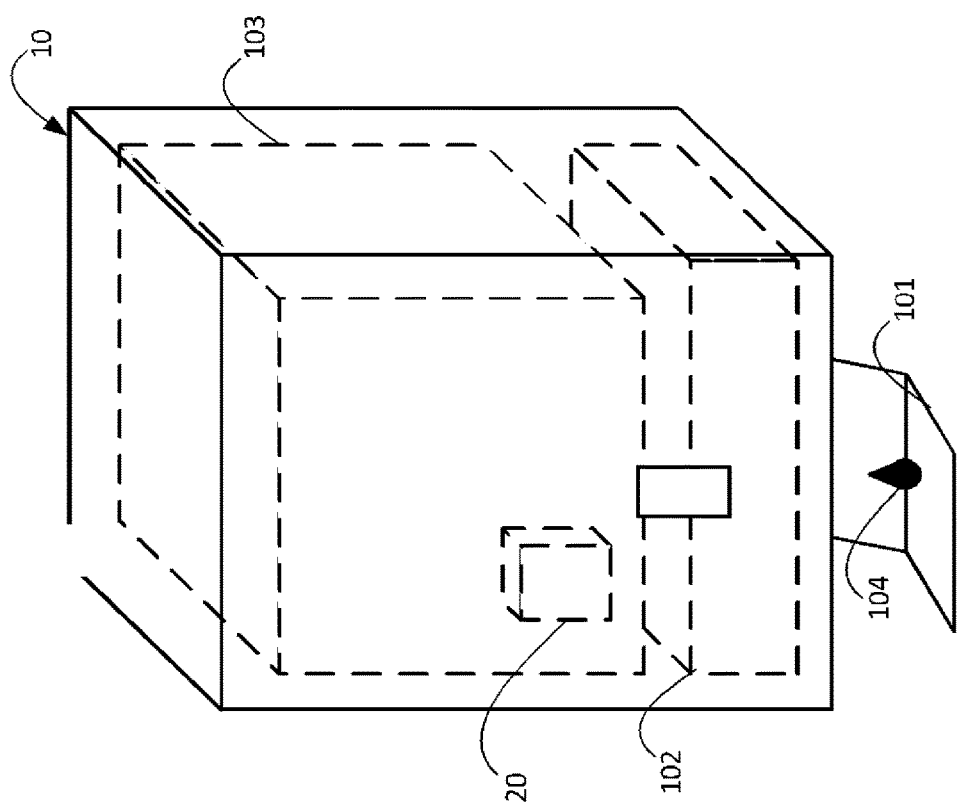
FIG. 1 shows a schematic view of a piece of hygiene equipment according to an exemplary embodiment herein.

FIG. 1 shows a schematic view of a piece of hygiene equipment 10 according to an embodiment of the present invention. Specifically, the figure shows a piece of hygiene equipment in the form of a soap, gel, foam, or liquid dispenser 10. As shown, the dispenser 10 is configured to dispense a consumable to a user in that, for example, a lever 101 is actuated for driving an ejection mechanism 102, which, in turn, ejects an amount 104 of the consumable held in a reservoir 103. The consumable may be accordingly liquid or solid soap, a disinfectant liquid/consumable, a foaming liquid, etc. As a consequence, a user's hand actuating the lever 101 can be provided with the amount 104 of soap, foam, or disinfectant. Although a liquid dispenser is shown, the following details may equally be combined with the respective components of a dispenser for solid substances, tissues, towels, absorbent articles, or other hygiene articles.

In the embodiment shown in FIG. 1, the piece of hygiene equipment 10 is configured to dispense a consumable to a user. By way of alternative, the piece of hygiene equipment 10 may be configured to dispose of a consumable from a user. By way of further alternative, the piece of hygiene equipment may be a "non-dispensing" piece of hygiene equipment such as data collection devices (for example, door passage sensors and people counters) provided in washrooms or the like, which provides data for use in management of cleaning or other maintenance actions. Alternatively, the piece of hygiene equipment 10 may comprise any one of a soap dispenser, a towel dispenser a disinfectant dispenser, an alcogel dispenser, a tissue dispenser, a hygiene article dispenser, a waste bin, a used towel bin, and a toilet paper dispenser.

In the embodiment shown in FIG. 1, a sensor device 20 is mounted on the piece of hygiene equipment 10 (that is, physically coupled to the piece of hygiene equipment 10 by any suitable means). The sensor device 20 may, as in the present embodiment, be configured to sense a filling state of the consumable in the reservoir 103. In general, the detailed mechanical and/or electronic mechanisms and configurations for dispensing an amount of consumable and detecting use instances and filling states (or, in a case where the piece of hygiene equipment is configured to dispose of a consumable from a user, mechanical and/or electronic mechanisms and configurations for disposing of a consumable or an amount thereof from a user and detecting use instances and empty states) are as such known in the prior arts.

Alternatively, the sensor device 20 may be configured to sense any other useful information. By way of example, the sensor device 20 may be configured to sense at least one of changes in or a value of luminosity, light, humidity, temperatures, volatile organic compound (VOC) level, occupancy or movement (by a person), use instances (of the piece of hygiene equipment 10), or power levels of a battery of the piece of hygiene equipment 10 or of the sensor device 20.

The sensor device 20 may, as in the present embodiment, be located on an interior surface of the piece of hygiene equipment 10, such as on an external surface of the reservoir 103. In general, the term "mounted on the piece of hygiene equipment" includes the sensor device 20 being mounted within the piece of hygiene equipment 10, or provided as part of the piece of hygiene equipment 10, mounted on an exterior surface of the piece of hygiene equipment 10, or mounted on a wall or other surface in close proximity to the piece of hygiene equipment 10. In addition, the term "mounted on the piece of hygiene equipment" includes the sensor device 20 being a modular sensor device that is configured to be easily and conveniently physically connected to the piece of hygiene equipment 10 using, by way of example, a snap-fit connection, a hook-and-pin connection, an adhesive, etc. Furthermore, the term "mounted on the piece of hygiene equipment" includes the sensor device 20 being physically connected on the piece of hygiene equipment 10 and/or being electronically connected to one or more circuits of the piece of hygiene equipment 10. By way of example, the sensor device 20 may be hardwired into the dispenser by means of some wired connection, such as a USB contact or similar, in addition to, or alternatively to, being physically connected to the piece of hygiene equipment 10. Such a configuration may allow the sensor device 20 to extract information (for example, battery status, quality parameters, etc.) from the piece of hygiene equipment 10, or for the sensor device 20 to be powered by a power source, such as a battery, of the piece of hygiene equipment 10.

The position of the sensor device 20 mounted on the piece of hygiene equipment 10 may be based on the function of the sensor. By way of example, in a case where the sensor device 20 is configured to sense a filling state of the consumable in the reservoir 103 the sensor device may be provided on the ejection mechanism 102 or, as in the present embodiment, on the reservoir 103. By way of further example, in a case where the sensor device 20 is configured to sense a change in or a value of luminosity, light, humidity, or temperature, the sensor device 20 may be provided on an exterior surface of the piece of hygiene equipment 10.

In the embodiment shown in FIG. 1, the piece of hygiene equipment 10 comprises a single sensor device 20. Alternatively, the piece of hygiene equipment 10 may comprise two or more sensor devices. In a case where the piece of hygiene equipment 10 has two or more sensor devices, the sensor devices may have different functions or may interact to perform a single function.

FIG. 2 shows a schematic view of the sensor device 20 in accordance with an exemplary embodiment herein. In accordance with the present embodiment, the sensor device 20 comprises a sensor 222. Alternatively, the sensor device may comprise two or more sensors.

According to the shown embodiment in FIG. 2, the sensor device 20 comprises a processing circuit 211, a radio circuit 212, and antenna 213 and a memory 214. Generally, the radio circuit 212 is configured to receive and transmit radio signals carrying data using the antenna 213. The processing circuit 211 may, as in the present embodiment, be configured to control the radio circuit 212 to receive and transmit data obtained by the processing circuit 211. The radio circuit 212 may, as in the present embodiment, receive radio signals originating from and transmit radio signals towards a central entity, for example, via a gateway device. The central entity may be a central device, such as central server device 40 (shown in FIG. 7), or a distributed identity.

By way of general example, a building may be provided with one or more sensor devices 20 mounted on one or more respective pieces of hygiene equipment. The sensor devices 20 may transmit data to and receive data from one or more gateways, localized in the building. The gateway(s) may be configured to forward the data received from the sensor devices 20 in the building to a central entity in the form of a cloud-based service and/or to forward data from the central entity to the sensor devices 20 in the building. A user (for example, service personnel) may view processed data and interact with the system (for example, receive notifications regarding required maintenance) via an application running on a mobile computing device or a web-interface. Additionally or alternatively, the one or more gateways may have a display unit or other means of providing notifications to a user.

The processing circuit 211 may, as in the present embodiment, be coupled to sensor 222 so as to be able to receive data from the sensor 222. The processing circuit 211 may be further configured to store data received from the sensor 222 in memory 214 and/or to control the radio circuit 212 to transmit data received from the sensor 222 to a central entity. The sensor device 20 may be configured to transmit the information by any suitable means known to those versed in the art. The processing circuit 211 and/or the radio circuit 212 may be configured to process the data received from the sensor 222 prior to transmission or storage of the data.

The processor 211 of the sensor device 20 may, as in the present embodiment, be configured to process the data received from the sensor 222 to detect an abnormality or a condition in which a maintenance action (that is, an action carried out by service personnel) is required and to control the radio circuit 212 to transmit a report—whenever found necessary—containing related information toward a central entity, e.g., central server device 40, over the (external) data network. Alternatively, the processor 211 may be configured to control the radio circuit 212 to continuously or periodically transmit data received from the sensor 222 towards a central entity. In this case, the central entity may be configured to process the data received from the sensor device 20 to detect an abnormality or a condition in which a maintenance action is required. In either case, the data may be transmitted in combination with information indicative of the location of the piece of hygiene equipment 10 and/or information indicative of an identification of the sensor device 20.

As a result, the central entity may be enabled to generate guiding information that tells service personnel that a specific piece of hygiene equipment 10, located at a specific position (e.g., room number, floor number, 3D-coordinates, and the like) requires a maintenance action.

By way of example, in embodiments such as in the present embodiment in which the sensor device 20 is configured to sense a filling state of the consumable in the reservoir 103, the sensor device 20 will at a certain time detect that the supply of consumable in the piece of hygiene equipment 10 on which it is mounted is about to run empty, based on data output by the sensor 222. Accordingly, it may be determined that a refill of the reservoir 103 becomes necessary. The processing circuit 211 of the sensor device 20 may generate data including information on the necessity of such a refill and including information on an identification of the sensor device 20 and information on where the piece of hygiene equipment 10 on which it is mounted is located. This data may be transmitted to a central entity. More generally, the maintenance action determined to be necessary by the sensor device 20 will depend on the purpose of the sensor 222. By way of example, in embodiments where the sensor 222 of the sensor device 20 is configured to sense changes in or a value of luminosity, light, humidity or temperatures, maintenance action determined to be necessary by the sensor device 20 may comprise an adjustment of an air-conditioning, heating, or climate control system, adjusting the lighting in a room or replacing lighting fittings in a room. Alternatively, in embodiments where the sensor 222 of the sensor device 20 is configured to sense power levels of a battery in the piece of hygiene equipment 10, the determined maintenance action may comprise replacing or recharging a battery. In embodiments where the piece of hygiene equipment 10 is a data collection device, such as a people counter, and the sensor 222 of the sensor device 20 is configured to sense occupancy or movement (by a person) or use instances (of the piece of hygiene equipment 10), the determined maintenance action may not be immediately executed (for example, the determined maintenance action may comprise replacing or inspecting a piece of hygiene equipment after a certain number of uses, for example, 1,000 uses or more, 10,000 uses or more, etc.). Alternatively, a maintenance action may not be determined to be necessary and the data may be stored for other purposes, such as management and planning of facilities in the building.

The sensor device 20 may, as in the present embodiment, be provided with an identification of the sensor device 20 in the form of a QR code 224 and a label 226 having an identification number 228 of the sensor device 20 printed thereon. The label 226 may, as in the present embodiment, be provided on the sensor device 20. Alternatively, the label may be provided on packaging of the sensor device 20 or provided individually (for example, as a sticker) with the sensor device 20. By way of further alternative, the content of the label may be provided directly on a surface of the sensor device 20. In general, the identification of the sensor device 20 allows the sensor device 20 to be uniquely identified and may comprise any suitable means known in the art, such as a QR code, bar code, an RFID tag, a NFC tag, a label with an ID number, etc.

In the embodiment shown in FIGS. 1 and 2, the sensor device 20 comprises the processing circuit 211, the radio circuit 212, the antenna 213 and the memory 214 and the sensor device 20 itself is configured to process and transmit the data output by sensor 222. By way of alternative, the piece of hygiene equipment 10 may comprise a processing circuit, a radio circuit, one or more antennae, and a memory instead of or in addition to the sensor device 20. In such an embodiment, the sensor device 20 may be configured to provide raw data output by sensor 222 to the piece of hygiene equipment 10, which is configured to process, store and/or transmit the sensor data.

Figure 3:
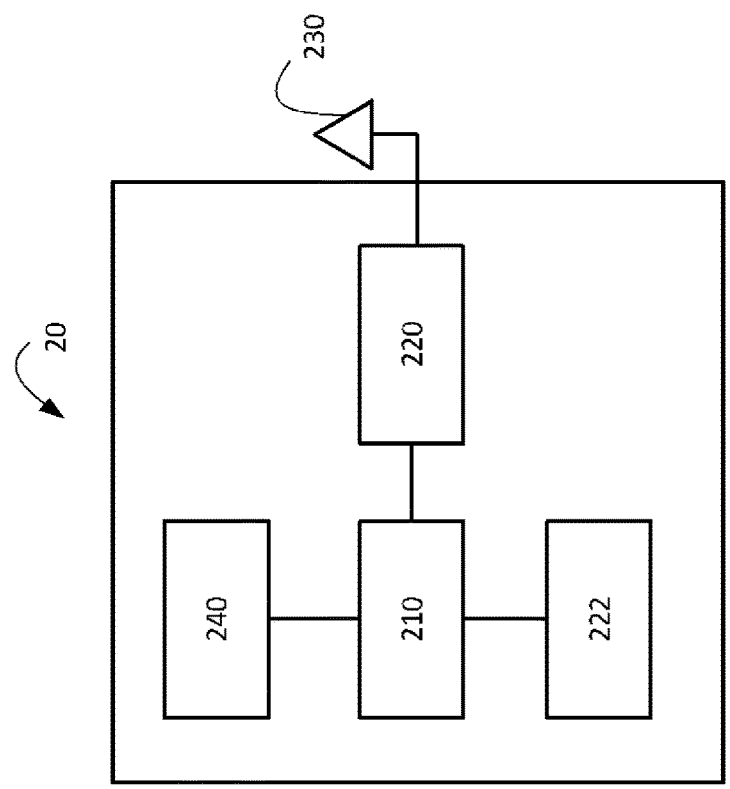
FIG. 3 shows a block diagram illustrating an exemplary hardware configuration of the sensor device of FIG. 2, in accordance with an embodiment herein.

FIG. 3 shows a block diagram illustrating an exemplary hardware configuration of the sensor device 20 of FIG. 2, in accordance with an exemplary embodiment herein. Specifically, a sensor device 20 has a sensor 222, a processing circuit 210, a radio circuit 220, an antenna 230, and a memory 240. The radio circuit 220 is configured to receive and transmit a radio signal carrying data using the antenna 230. The memory 240 stores code to configure the processing circuit 210 to process data received from a sensor 222 and to instruct the radio circuit 220 to receive and/or transmit a radio signal carrying data.

The processing circuit may comprise, by way of example, a processor, such as a Central Processing Unit, CPU, or Signal Processing Unit. The memory 240 may comprise a ROM (e.g., in the form of an electrically-erasable programmable read-only memory (EEPROM) or flash memory) which is pre-loaded with the computer-readable instructions which the processing circuit may execute as well as a working memory (e.g., a random access memory, RAM, or similar type of memory).

As described above, in order for the sensor device 20 to provide useful data, it is necessary to determine an identification of the sensor device 20 and information indicative of a location of the piece of hygiene equipment 10 with which the sensor device 20 is to be associated. This information is typically determined as part of the installation of the sensor device 20. In this context, the term installing means setting up and configuring for use.

In general, the sensor device 20 may be installed and mounted on the piece of hygiene equipment 10 at the same time as the piece of hygiene equipment 10 is installed and mounted. Alternatively, the sensor device 20 may be installed and mounted on a previously mounted piece of hygiene equipment 10. Furthermore, the sensor device 20 may be installed prior to mounting the sensor device 20 on the piece of hygiene equipment 10. Alternatively, the sensor device 20 may be mounted on the piece of hygiene equipment 10 and subsequently installed.

When installing a sensor device 20, an installation worker is generally equipped with a mobile computing device 30 (shown in FIG. 7) on which a computer application or web browser is running. The mobile computing device 30 may, as in the example of FIG. 7, be a smart phone. Alternatively, the mobile computing device 30 may be a tablet, a laptop, a dedicated device for use in sensor device installation, a combination of devices (such as a computer in communication with a mobile device having a positioning function), etc.

FIG. 4(*a*) shows a flow diagram illustrating a process for installing a sensor device 20, in accordance with an exemplary embodiment herein.

The process of FIG. 4(*a*) may, as in the present embodiment, be a process by which a mobile computing device 30 installs a sensor device 20. That is, the process steps S10, S15 and S20 of FIG. 4(*a*) may be performed by the mobile computing device 30.

In process step S10 of FIG. 4, the mobile computing device 30 obtains, from the sensor device 20, information indicative of an identification of the sensor device 20.

As discussed above, the sensor device 20 may, as in the present embodiment, be provided with an identification of the sensor device 20 in the form of, for example, a QR code 224 and a label 226 having an identification number 228 of the sensor device 20 printed thereon. In general, the identification of the sensor device 20 allows the sensor device 20 to be uniquely identified and may comprise any suitable means known in the art.

In general, the term "obtaining from the sensor device" implies that information is obtained directly from the sensor device 20 (and not, for example, by a user of the mobile computing device 30 reading information and inputting this information to the mobile computing device 30) and that the information is in a form that is understandable by the mobile computing device 30 or in a form which can be converted, by the mobile computing device 30, into a form that is understandable by the mobile computing device 30. As such, it is not necessary for the user of the mobile computing device 30 to provide input in order for the mobile computing device 30 to interpret the information obtained from the sensor device 20.

By way of example, the mobile computing device 30 may, as in the present embodiment, obtain the information indicative of an identification of the sensor device 20 by reading the QR code 224 provided on the sensor device 20. Alternatively, the sensor device 20 may be provided with a barcode, RFID tag and/or NFC tag, from which the information indicative of an identification of the sensor device 20 may be read. By way of further alternative, the mobile computing device 30 may obtain the information indicative of an identification of the sensor device 20 from an image of the label 226 provided on the sensor device 20 using image recognition techniques. The identification number 228 on the label 226 may be composed of alphanumeric characters, a binary value, etc., and provided in visible or invisible inks or the like. In particular, invisible inks or the like may be substances that can be applied to a writing surface such that, once dry or treated, it is unperceivable or substantially unperceivable to the human eye. Invisible inks and the like may be machine readable and/or further treated (for example, chemically or using UV light or heat) to render it readable and/or visible, or the invisible inks may provide distinguishable optical characteristics in the infrared (IR) or ultraviolet (UV) light wavelength range so that they remain invisible to the human eye but can be machine read.

Alternatively, by way of further example, the sensor device 20 may be configured to transmit the information indicative of an identification of the sensor device 20 which can be received by the mobile computing device 30. In such embodiments, the mobile computing device 30 may comprise an imaging unit or any other means necessary for obtaining the information indicative of an identification of the sensor device 20.

Alternatively, by way of further example, the sensor device 20 may be provided with a means (e.g., radio circuit 212) of transmitting, for example, by low energy radio, information indicative of its identification which can be received by the mobile computing device 30.

In process step S15 of FIG. 4(*a*), the mobile computing device 30 obtains information indicative of a location of a piece of hygiene equipment 10 with which the sensor device 20 is to be associated.

The location may, as in the present embodiment, be a room of a building. Alternatively, the location may be, for example, a floor of a building, a cubicle, a particular dispenser of a plurality of dispensers in a room or on a floor, a position of a dispenser in a 3D or 2D coordinate system, etc. The information indicative of a location may comprise the actual location of the piece of hygiene equipment 10 or an indicator that allows the mobile computing device 30 or another device (e.g., central server 40) to obtain the location of the piece of hygiene equipment 10 (such as, for example, a pointer to a memory location storing location data, an index in a list of locations, or a key for an array of location data).

The mobile computing device 30 may, as in the present embodiment, obtain the location by receiving input from the user of the mobile computing device 30. By way of example, the user may, as in the present embodiment, mark the location of the piece of hygiene equipment 10 with which the sensor device 20 is to be associated on an interactive map (drop and drag system). Alternatively, the user may manually input the location of the piece of hygiene equipment 10 using an input unit of the mobile computing device 30 such as, for example, a key board or a microphone.

By way of alternative, in a case where the mobile computing device 30 comprises positioning system, the mobile computing device 30 may obtain the location by obtaining current position information using the positioning system. The positioning system may be a global positioning system (GPS) which determines a location of a GPS receiver based on time and the known position of GPS specialized satellites. Alternatively, the positioning system may be configured to determine a position based on a previous known or determined position and data output one or more sensors provided in the mobile computing device 30, such as accelerometers and/or gyroscopes (dead reckoning) or by using 5G technology.

By way of further alternative, the positioning system may be an indoor ranging system, which are known in the art and rely on technology including, for example, Bluetooth™, BLE (Bluetooth™ Low Energy), ultra-wideband technology, angle of arrival (AOA) technology, time difference of arrival (TDOA) technology, Wi-Fi access point based positioning technology, etc. Such indoor ranging systems may be particularly advantageous in cases where GPS or other satellite based positioning systems are not available, because satellite signals are blocked or weakened by large buildings, mountains, etc.

Figure 5B:
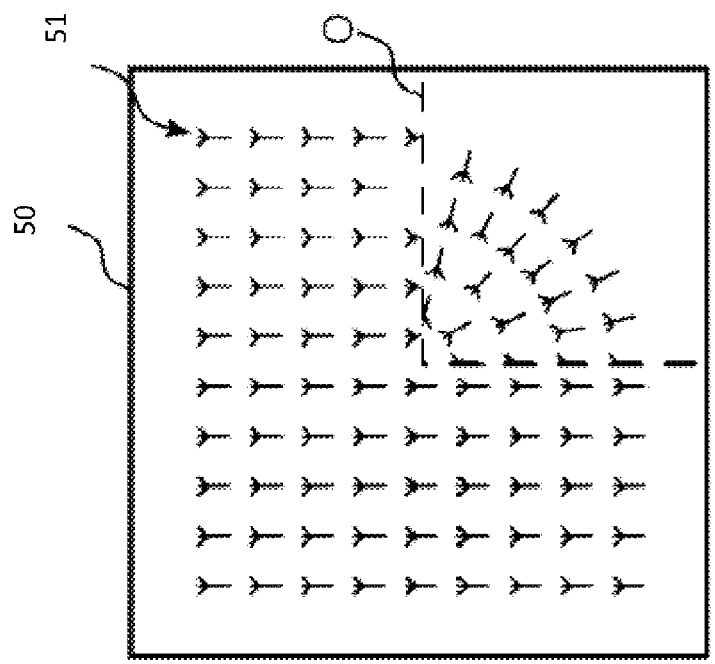
FIGS. 5(a) and 5(b) show schematic views of locating and positioning schemes applicable for at least some embodiments of the present invention.
Figure 5A:
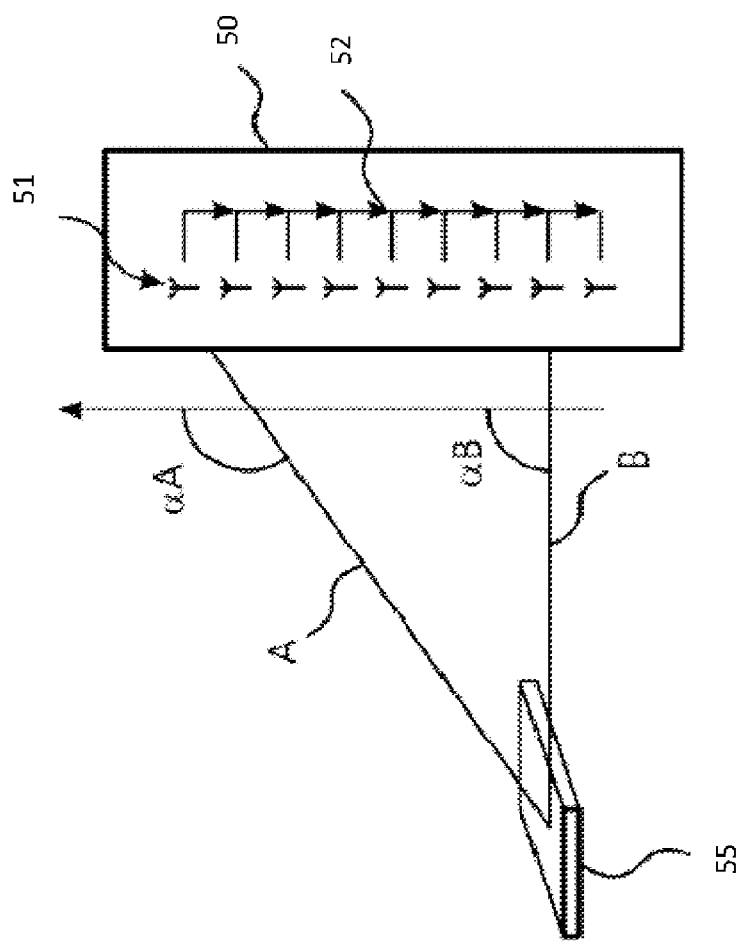

By way of example of an indoor ranging system, FIGS. 5(a) and 5(b) show schematic views of locating and positioning schemes based on AOA technology that are applicable for at least some embodiments of the present invention. FIG. 5(a) shows a schematic view of positioning equipment for determining information on a direction or an angle of arrival according to a first example. Specifically, it is shown a possible implementation of a corresponding positioning device 50 which may provide an antenna array 51 and a phase run time line 52. The positioning device 50 may be provided somewhere in the building, the floor or the room in which the sensor device 20 is to be installed.

In this example, a detection and reporting device 55, which may be provided in the mobile computing device 30, is assumed to emit a radio signal that then can reach the positioning device 50, and, with this, the antenna array 51 along two paths A and B along the line of sight. These paths will intersect a given base line with corresponding angles $\alpha A$ and $\alpha B$. It is known to determine information on a distance and/or a position with two, three or more angles available. This concept is known as triangulation and methods exist in the arts.

The angles $\alpha A$ and $\alpha B$ can be, for example, determined by means of said phase run time line 52 where signals received by the individual antennas run and establish a certain phase relation to each other. This phase relation is a figure for a timing difference with regard to points in time when the radio signal has hit the antennas along the different paths. With this information angles can be obtained, which can serve as a basis for determining the information on a position and/or distance. Likewise, a series of arrival times over the antenna array can be measured from which then one or more angles, and, in turn, an information on a position of the originator of the radio signal (that is, of the mobile computing device 30) can be calculated.

FIG. 5(b) shows a schematic view of positioning equipment for determining information on a direction or an angle of arrival according to another example. This alternative example considers the device 50 being arranged to measure information on an angle $\alpha A'$ (not shown) in the x-y-plane and an angle $\alpha A''$ (not shown) in the x- z- or y-z-plane. Specifically, this example considers an array of antennas 51 in the form of a two-dimensional matrix (as shown) or a circular matrix with antennae arranged along polar coordinates as shown in the option box O. An incoming radio signal will trigger the individual antennae of the matrix at different times and thus allows the calculation of the two angles $\alpha A'$ and $\alpha A''$ for, ultimately, determining information on a position in 2 or 3 dimensions of a radio signal source (i.e., a tag) that is provided in the mobile computing device 30. Further, a spherical antenna may be employed that provides the individual antennae on a surface of a sphere.

Once the position of the originator of the radio signal (that is, of the mobile computing device 30) has been calculated by the positioning device 50, the position device 50 may be configured to transmit information indicative of the positioning device to the mobile computing device 30.

By way of further alternative, the mobile computing device 30 may obtain the location by obtaining, from the piece of hygiene equipment 10, information indicative of the location of the piece of hygiene equipment 10. By way of example, the piece of hygiene equipment 10 may be provided with a QR code, barcode, RFID tag and/or NFC tag, from which the information indicative of a location of the piece of hygiene equipment 10 may be read. Alternatively, information indicative of the location of the piece of hygiene equipment 10 may be provided on a label on the piece of hygiene equipment 10 and the mobile computing device 30 may obtain the information indicative of the location from an image of the label using image recognition techniques. In such embodiments, the mobile computing device 30 may comprise an imaging unit, for capturing an image of a barcode, a two-dimensional bar code, a DSS datamatrix, a QR code, or the like, or label, or any other means necessary for obtaining the information indicative of the location of the piece of hygiene equipment 10. The location information provided in the barcode, QR code, label, etc., may have been previously determined as part of an installation of the piece of hygiene equipment 10 (for example, labels corresponding to a known list of piece of hygiene equipment locations in, for example, a building may have been prepared and the correct label applied to each piece of hygiene equipment at some time prior to the installation of the sensor device 20).

Alternatively, by way of further example, the piece of hygiene equipment 10 may be provided with a means of transmitting information indicative of its location (by way of example, a radio circuit and antenna) which can be received by the mobile computing device 30. In such embodiments, the piece of hygiene equipment 10 may be provided with a positioning system or other means of determining it location.

Figure 4A:
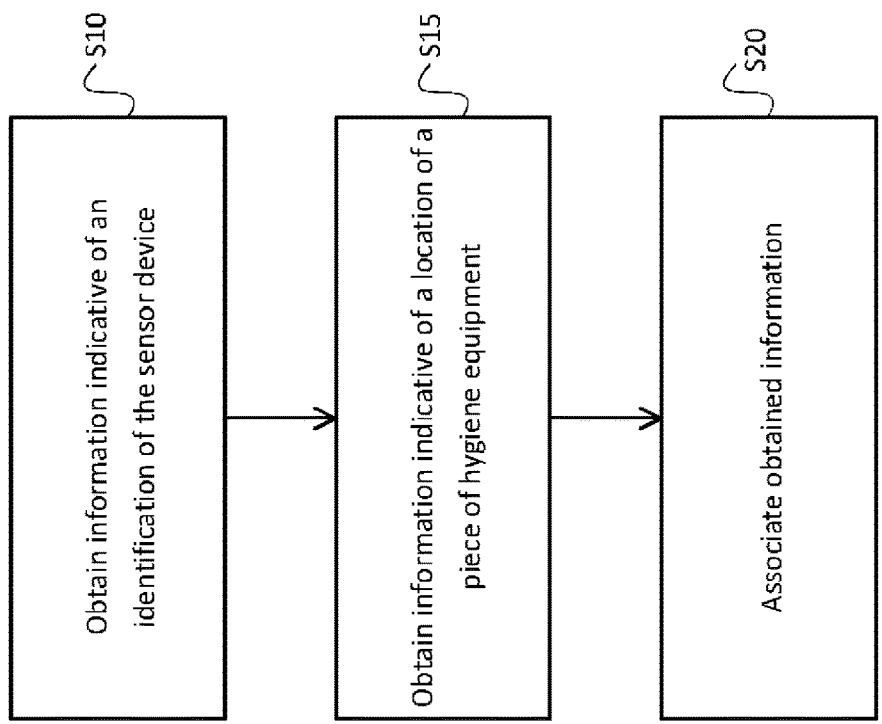

In process step S20 of FIG. 4(a), the mobile computing device 30 associates the information indicative of an identification of the sensor device 20 with the information indicative of a location of the piece of hygiene equipment 10.

The mobile computing device 30 may, as in the present embodiment, be configured to associate the information indicative of an identification of the sensor device 20 with the information indicative of a location of the piece of hygiene equipment 10 by storing the information indicative of an identification of the sensor device 20 in combination with the information indicative of a location of the piece of hygiene equipment 10. Additionally or alternatively, mobile computing device 30 may be configured to associate the information indicative of an identification of the sensor device 20 with the information indicative of a location of the piece of hygiene equipment 10 by transmitting, to a central entity such as the central server device 40, the information indicative of an identification of the sensor device 20 in combination with the information indicative of a location of the piece of hygiene equipment 10.

In embodiments such as the present embodiment, in which the mobile computing device 30 is configured to store the information indicative of an identification of the sensor device 20 in combination with the information indicative of a location of the piece of hygiene equipment 10, the mobile computing device 30 may be further configured to transmit the stored information to a central entity (such as central server device 40) at some time subsequent to the time at which the information is stored. By way of example, the user may control the mobile computing device 30 to transmit the stored information to the central entity only after a predetermined number of sensor devices have been installed or, alternatively, the mobile computing device 30 may automatically transmit the stored information to the central entity only after the predetermined number of sensor devices have been installed. By way of further alternative, the stored information may be exported from the mobile computing device 30 by any suitable wired or wireless means, including, for example, by on-line entry by the user.

In general, the mobile computing device 30 may be configured to transmit the information by any suitable means known to those versed in the art. For example, the mobile computing device 30 may transmit information via a direct communication link (which may be provided by any suitable wired or wireless connection, e.g., a Universal Serial Bus (USB) or a Bluetooth™ connection), or an indirect communication link (which may be provided by a network comprising a Local Area Network (LAN), a Wide Area Network (WAN) and/or the Internet). Furthermore, the information may be transferred by the mobile computing device 30 to a storage medium such as a CD or hard disk. The mobile computing device 30 may comprise processing and communication functionalities necessary to operate in accordance with one or more conventional telecommunication standards, including—but not limited to—GSM, PCS, 3GPP, LTE, LTE-A, UMTS, 3G, 4G, 5G.

The mobile computing device 30 may be configured to associate the information indicative of an identification of the sensor device 20 with the information indicative of a location of the piece of hygiene equipment 10 such that there is a one-to-one relationship between the information indicative of an identification of the sensor device 20 and the information indicative of a location of the piece of hygiene equipment 10. Alternatively, the mobile computing device 30 may be configured to associate the information indicative of an identification of the sensor device 20 with the information indicative of a location of the piece of hygiene equipment 10 such that information indicative of an identification of two or more sensor devices is associated with information indicative of a single location of a piece of hygiene equipment 10 (a many-to-one relationship).

As is apparent from the preceding description of the operations performed by the mobile computing device 30, the mobile computing device 30 is configured to associate the information indicative of an identification of the sensor device 20 with the information indicative of a location of the piece of hygiene equipment 10. Accordingly, in a case where the sensor device 20 transmits, to a central entity, data including information on, for example, the necessity of a maintenance action, the information will include the information on an identification of the sensor device 20 and the information indicative of a location of the piece of hygiene equipment 10. As a result, the central entity can generate guiding information that tells service personnel that a specific piece of hygiene equipment 10, located at a specific position (e.g., room number, floor number, 3D-coordinates, and the like) requires a maintenance action. That is, the sensor is set up and configured for correct operation (installed).

FIG. 4(*b*) shows a flow diagram illustrating a first modified process for installing a sensor device, in accordance with an exemplary embodiment herein. The process of FIG. 4(*b*) may, as in the present embodiment, be a process by which a mobile computing device 30 installs a sensor device 20. That is, the process steps S6*b*, S8*b*, S10*b*, S12*b*, S14*b*, S15*b* and S20*b* of FIG. 4(*b*) may be performed by the mobile computing device 30.

Process steps S10*b*, S15*b* and S20*b* of FIG. 4(*b*) correspond to process steps S10, S15 and S20 of FIG. 4(*a*). Therefore, the discussion of these process steps above in relation to FIG. 4(*a*) is equally applicable to FIG. 4(*b*), and only the differences from FIG. 4(*a*) will be described in detail. In particular, FIG. 4(*b*) illustrates a process by which a mobile computing device 30 guides a user of the mobile computing device 30 to install a sensor device 20.

In process step S6*b* of FIG. 4(*b*), the mobile computing device 30 prompts the user to provide information indicative of an identification of the sensor device 20.

By way of example, the mobile computing device 30 may, as in the present embodiment, have a computer application or web browser running thereon, with which the user interacts. The mobile computing device 30 may, as in the example of FIG. 7, be a smart phone. Alternatively, the mobile computing device 30 may be a tablet, a laptop, a dedicated device for use in sensor device installation, etc.

The mobile computing device 30 may be configured to prompt the user to provide information indicative of an identification of the sensor device 20 by any suitable means, including (but not limited to) providing a visual notification on a display unit of mobile computing device 30 (for example, in the form of banners, icons, a notification screen, a light, etc.), providing an audible notification using an output unit of the mobile computing device 30 (for example, in the form of a tone, a command, etc.) or providing a tactile notification using an output unit of the mobile computing device 30 (for example, in the form of a vibration, etc.).

The user may be prompted to provide information by any suitable means. By way of example, the user may be prompted to provide a confirmation that the mobile computing device 30 should proceed to obtain information indicative of an identification of the sensor device 20. Alternatively, the user may be prompted to select a means by which information indicative of an identification of the sensor device 20 should be obtained by the mobile computing device 30. The means may be any of those described above in relation to step S10 of FIG. 4(*a*). The user may provide such instruction using any suitable input unit of the mobile computing device 30 that is known in the art, such as, for example, a touch screen, a keyboard, a microphone, etc.

In process step S8*b* of FIG. 4(*b*), the mobile computing device 30 determines whether an instruction has been received from the user.

In process step S10*b* of FIG. 4(*b*), the mobile computing device 30 obtains, from the sensor device, information indicative of an identification of the sensor device, in accordance with the instruction received from the user. By way of example, in a case where the user is prompted to select a means by which information indicative of an identification of the sensor device 20 should be obtained by the mobile computing device 30, the mobile computing device 30 will obtain the information by the specified means.

In process step S12*b* of FIG. 4(*b*), the mobile computing device 30 prompts the user to provide information indicative of a location of a piece of hygiene equipment with which the sensor device is to be associated. The mobile computing device 30 may be configured to prompt the user to provide the information as discussed above in relation to step S6*b*.

In process step S14*b* of FIG. 4(*b*), the mobile computing device 30 determines whether an instruction has been received from the user.

In process step S15*b* of FIG. 4(*b*), the mobile computing device 30 obtains information indicative of a location of a piece of hygiene equipment with which the sensor device is to be associated, in accordance with the instruction received from the user.

In process step S20*b* of FIG. 4(*b*), the mobile computing device 30 associates the information indicative of an identification of the sensor device with the information indicative of a location of the piece of hygiene equipment.

FIG. 4(c) shows a flow diagram illustrating a second modified process for installing a sensor device, in accordance with an exemplary embodiment herein. The process of FIG. 4(c) may, as in the present embodiment, be a process by which a mobile computing device 30 installs a sensor device 20. That is, the process steps S6c, S8c, S10c, S15c and S20c of FIG. 4(c) may be performed by the mobile computing device 30.

Process steps S10c, S15c and S20c of FIG. 4(c) correspond to process steps S10, S15 and S20 of FIG. 4(a). Therefore, the description of these process steps above in relation to FIG. 4(a) is equally applicable to FIG. 4(c), and only the differences from FIG. 4(a) will be described in detail. In particular, FIG. 4(c) illustrates a process by which a mobile computing device 30 automatically installs a sensor device 20 in response to obtaining information indicative of an identification of the sensor device 20.

In process step S6c of FIG. 4(c), the mobile computing device 30 prompts the user to provide information indicative of an identification of the sensor device. The mobile computing device 30 may be configured to prompt the user to provide the information as discussed above in relation to step S6b of FIG. 4(b).

In process step S8c of FIG. 4(c), the mobile computing device 30 determines whether an instruction has been received from the user.

In process step S10c of FIG. 4(c), the mobile computing device 30 obtains, from the sensor device, information indicative of an identification of the sensor device, in accordance with the instruction received from the user.

In process step S15c of FIG. 4(c), the mobile computing device 30 automatically obtains a location of a piece of hygiene equipment with which the sensor device is to be associated. That is, the mobile computing device 30 is configured to obtain a location of a piece of hygiene equipment without requiring any further input or instruction from the user of the mobile computing device 30. The mobile computing device 30 may, by way of example, be configured to obtain a location of a piece of hygiene equipment by receiving information transmitted by the piece of hygiene equipment 10 or, in one embodiment, using a positioning system of the mobile computing device 30, as described above in relation to FIG. 4(a).

In process step S20c of FIG. 4(c), the mobile computing device 30 automatically associates the information indicative of an identification of the sensor device 20 with the information indicative of a location of the piece of hygiene equipment 10. That is, the mobile computing device 30 is configured to associate the obtained information without requiring any further input or instruction from the user of the mobile computing device 30. Therefore, in embodiments where the mobile computing device 30 is configured to associate the information indicative of an identification of the sensor device 20 with the information indicative of a location of the piece of hygiene equipment 10 by storing the obtained information in combination and/or by transmitting, to a central entity (such as the central server device 40 or a distributed identity), the obtained information in combination, the mobile computing device 30 may be configured to do so automatically.

In some embodiments, as in the present embodiment, the sensor device may require an additional installation step to be carried out in order for the sensor device to operate correctly, namely, authorizing the sensor device 20 to access a communication network so that it can, for example, transmit data towards a central entity. Therefore, in such embodiments, the process of any of FIGS. 4(a)-4(c) may optionally further comprise the mobile computing device 30 performing the step of transmitting, to the sensor device 20, security information for use in accessing a communication network. The security information may, for example, be a password or a security key. Alternatively, the security information may be a private or public encryption key for use in encrypting data transmitted on the communication network, network credentials for secure communication, or any other suitable form of security information.

Additionally or alternatively, the sensor device may require further additional installation steps to be carried out in order for the sensor device to operate correctly. By way of example, in a case where the piece of hygiene equipment 10 is a people counter, the sensor device 20 may need to be provided with information indicative of the size of the room in which it is placed and, in the case where the sensor device 20 is configured to detect a value or a change in luminosity, the sensor device 20 may need to be calibrated by inputting an initial light level. Accordingly, the mobile computing device 30 may perform further additional installation steps in addition to the process of any of FIGS. 4(a)-4(c) such as, for example, obtaining, information indicative of a type of environment in which the sensor device 20 is located (e.g., indoors, outdoors, in a basement, a size of a room, etc.), light levels, placement, a date of installation of the sensor device 20, whether the sensor device 20 requires a software updates, etc. By way of further example of an additional installation step, the mobile computing device 30 may transmit such information to the sensor device 20.

Additionally, the mobile computing device 30 may be configured to perform any suitable tests to determine if the sensor device 20 has been installed correctly. The mobile computing device 30 may be configured to associate the results of such tests in combination with the information indicative of an identification of the sensor device 20 and the information indicative of a location of the piece of hygiene equipment 10.

Additionally, it may be advantageous to associate, with the information indicative of an identification of the sensor device 20 and the information indicative of a location of the piece of hygiene equipment 10, information indicative of a type of the piece of hygiene equipment 10 and/or information indicative of a type of the consumable. This may be particularly advantageous in embodiments such as the present embodiment, in which the sensor device 20 is configured to sense a filling state of the consumable in the reservoir 103. Accordingly, in a case where the sensor device 20 transmits to a central entity information indicating that a maintenance action, such as a refill of a consumable stored in reservoir 103, is necessary, the central entity determine, for example, the type of a consumable, a volume or amount of the consumable, a particular tool for use with that type of hygiene equipment, etc., that a service person should bring.

Therefore, the process of any of FIGS. 4(a)-4(c) may optionally further comprise the mobile computing device 30 performing the steps of obtaining, from the piece of hygiene equipment 10, information indicative of a type of the piece of hygiene equipment 10 and associating the information indicative of the type of the piece of hygiene equipment 10 with the information indicative of an identification of the sensor device 20 and the information indicative of a location of the piece of hygiene equipment 10. The information indicative of a type of the piece of hygiene equipment 10 may indicate, by way of example, a function of the piece of hygiene equipment 10 (e.g., whether it is a soap dispenser or a used towel bin, etc.), a model of the piece of hygiene equipment 10, a size of the piece of hygiene equipment 10, etc.

Additionally or alternatively, the process of any of FIGS. 4(a)-4(c) may optionally comprise the mobile computing device 30 performing the steps of obtaining information indicative of a type of the consumable; and associating the information indicative of the type of the consumable with the information indicative of an identification of the sensor device 20 and the information indicative of a location of the piece of hygiene equipment 10. In this case, it is assumed that the piece of hygiene equipment 10 is configured to dispense a consumable to a user.

The mobile computing device 30 may obtain the information indicative of a type of the piece of hygiene equipment 10 and/or information indicative of a type of the consumable from the piece of hygiene equipment 10 by any means discussed above in relation to process steps S10 and S15 of the process of any of FIGS. 4(a)-4(c). Alternatively, the mobile computing device 30 may obtain the information indicative of a type of the piece of hygiene equipment 10 and/or information indicative of a type of the consumable from the piece of hygiene equipment 10 by imaging the piece of hygiene equipment 10 and using photo analysis techniques to identify the type of the piece of hygiene equipment 10 and/or the type of the consumable. By way of further alternative, the user may manually input the type of the consumable using an input unit of the mobile computing device 30 such as, for example, a key board or a microphone.

The information indicative of a type of the consumable may comprise, by way of example, a general type of the consumable (for example, liquid soap or hand towels) and/or variants of this more general type (for example, regular or hypo-allergenic soap and a paper grade associated with the hand towels). In a case where the type of the consumable comprises both a general type and a variant of the consumable, the mobile computing device 30 may obtain a single information indicative of both the general type and variant of the consumable or the mobile computing device 30 may obtain information indicative of the general type and information indicative of the variant of the consumable separately, by the same or separate means.

The process steps of the process of any of FIGS. 4(a)-4(c) and any additions thereto and alterations thereof may be implemented in any suitable order. By way of non-limiting example, the steps of obtaining the information indicative of an identification of the sensor device 20 and the information indicative of a location of the piece of hygiene equipment 10 may be performed concurrently. For example, in a case in which the mobile computing device 30 obtains information indicative an identification of the sensor device 20 and a location of the piece of hygiene equipment 10 by scanning QR codes, the mobile computing device 30 may simultaneously image a QR code provided on the sensor device 20 and a second QR code provided on the piece of hygiene equipment 10, the first providing information indicative an identification of the sensor device 20 and the second providing information indicative of a location of the piece of hygiene equipment 10 and associate the information based on the appearance of both QR codes in the image. This may be facilitated by consciously placing a label of the piece of hygiene equipment 10 close to a position of the mounted sensor device 20.

The process of any of FIGS. 4(a)-4(c) and any additions thereto and alterations thereof may be implemented be any suitable means. By way of example, the process of any of FIGS. 4(a)-4(c) may be implemented by a computer program comprising instructions, which, when executed by a computer, cause the computer to perform the process of any of FIGS. 4(a)-4(c). Alternatively, the process of any of FIGS. 4(a)-4(c) may be implemented by an application, downloadable from a data repository, comprising computer instructions, which, when executed by a mobile computing device, cause the mobile computing device to perform the process of any of FIGS. 4(a)-4(c). By way of further alternative, the process of any of FIGS. 4(a)-4(c) may be implemented by mobile computing device comprising a radio circuit, a processor; and a memory, wherein the memory is configured to store instructions which, when executed by the processor, cause the processor to perform the process of any of FIGS. 4(a)-4(c). The computer which executes the computer program or the mobile computing device may comprise a camera, a radio circuit, a GPS or other positioning system and any other means necessary to obtain information from the sensor and piece of hygiene equipment or be coupled to additional devices providing these means.

Figure 6E:
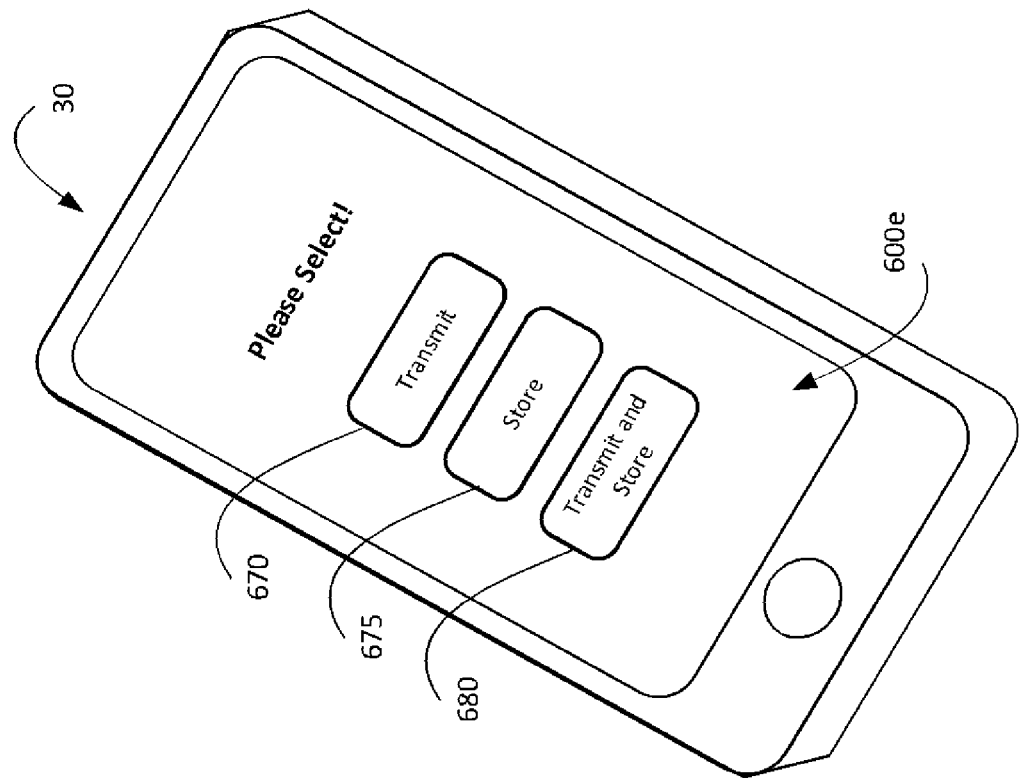

An installation worker generally controls a mobile computing device 30 to run a computer application, a web browser or a computer program for use in installing a sensor device 20. FIGS. 6(a)-6(e) shows schematic illustrations of a graphical user interface (GUI) displayed on the display unit of the mobile computing device 30, in accordance with an exemplary embodiment herein. FIG. 7 shows a schematic sequence diagram of an exemplary modus operandi for installing a sensor device, in accordance with an exemplary embodiment herein. In the embodiment of FIGS. 6(a)-(e) and FIG. 7), the mobile computing device 30 is a smartphone. Alternatively, the mobile computing device 30 may be a tablet, a laptop, a dedicated device for use in sensor device installation, etc.

In FIG. 6(a), screen 600a prompts the user to obtain information indicative of a location of the piece of hygiene equipment 10 with which the sensor device 20 being installed is to be associated. The screen 600a may comprise one or more buttons (or any other suitable object with which a user of the GUI may interact, such as a drop-down menu). By way of example, in the present embodiment, screen 600a comprises three buttons, namely, a "map" button 610, a "current location" button 615 and a "keyboard" button 620. By selecting the "map" button 610 (for example, by tapping the "map" button 610 with a digit or stylus, or by any other suitable means), the user may instruct the mobile computing device 30 to obtain the location by receiving input from the user, who marks the location of the piece of hygiene equipment 10 on an interactive map 630 (shown in FIG. 6(b)). Alternatively, by selecting the "current location" button 615, the user may instruct the mobile computing device 30 to obtain the location by obtaining current position information using a positioning system of the mobile computing device 30. By selecting the "keyboard" button 620, the user may manually input the location of the piece of hygiene equipment 10 using a key board (or other suitable input unit) of the mobile computing device 30.

Alternatively, the screen 600a may include any other suitable buttons or other objects to instruct the mobile computing device 30 to obtain information indicative of a location of the piece of hygiene equipment 10. By way of example, the screen 600a may include a "same as previous" button, which allows the user to instruct the mobile computing device 30 to obtain the location by reusing a previously obtained location as the location for the current piece of hygiene equipment 10. Such a button may be particularly useful where multiple sensor devices 20 are installed in close proximity (e.g., in a soap dispenser and a towel dispenser over a single wash basin or in multiple soap dispensers in a single washroom).

FIG. 6(b) shows screen 600b which is displayed when the user selects the "map" button 610 in screen 600a. The user may then instruct the mobile computing device 30 to obtain the location by marking the location of the piece of hygiene equipment 10 on an interactive map 630 using pin 635. In the embodiment shown in FIG. 6(b), the map 630 is of a single floor of a building and drop down menu 640 allows the user to navigate between floors. Alternatively, drop down menu 640 may not be included in screen 600b and the map 630 may be of an entire building or a single floor. In some embodiments, additional buttons, etc., may be provided to allow convenient navigation of the map 630 (for example, for allowing the user to zoom in, zoom out, and move in one or more directions). Once the user has selected the location, the user may select the "complete" button 645 to confirm the location.

This process is illustrated in optional steps S701-1 and S701-2 of FIG. 7. Step S701-1 illustrates a case in which the mobile computing device 30 may, optionally, obtain the information indicative of a location of the piece of hygiene equipment 10 by receiving or obtaining information from piece of hygiene equipment 10. By way of example, the GUI may include an option to read the information indicative of a location of the piece of hygiene equipment 10 from a QR code provided on the piece of hygiene equipment 10. Step S701-2 illustrates an alternative case in which the mobile computing device 30 may, optionally, obtain the information indicative of a location of the piece of hygiene equipment 10 by determining the location itself or using user input, for example, as described above in relation to FIG. 6(c). By way of further alternative, the mobile computing device 30 may perform both steps S701-1 and S701-2 in order to, for example, confirm the location or provide a more accurate location.

In FIG. 6(c), screen 600c prompts the user to obtain, from the sensor device 20, information indicative of an identification of the sensor device 20. The screen 600c may comprise one or more buttons (or any other suitable object with which a user of the GUI may interact, such as a drop-down menu). By way of example, in the present embodiment, screen 600c comprises two buttons, namely, a "scan QR code" button 650 and a "read ID number" button 655. By selecting the "scan QR code" button 650, the user may instruct the mobile computing device 30 to obtain the information indicative of an identification of the sensor device 20 by reading a QR code provided on the sensor device. By selecting the "read ID number" button 650, the user may instruct the mobile computing device 30 to obtain the information indicative of an identification of the sensor device 20 by imaging a label provided on the sensor device 20 on which an identification number of the sensor device 20 is provided and obtaining the identification number from the image using image recognition techniques (such as, for example, optical character recognition).

Figure 6D:
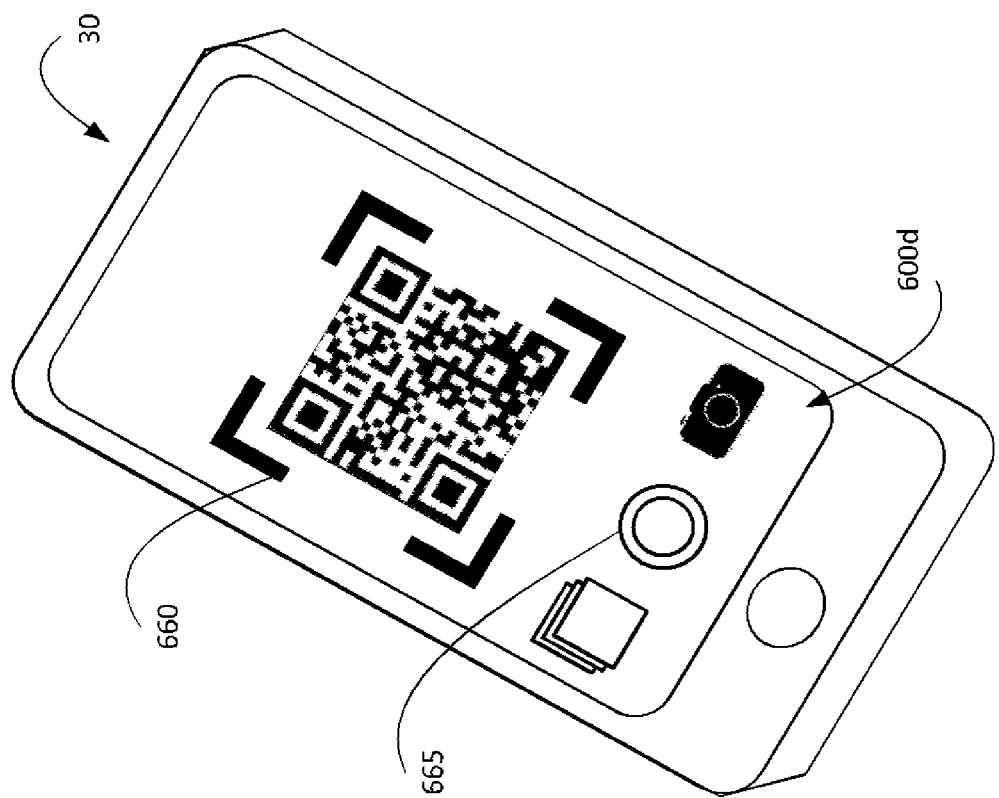
Figure 7:
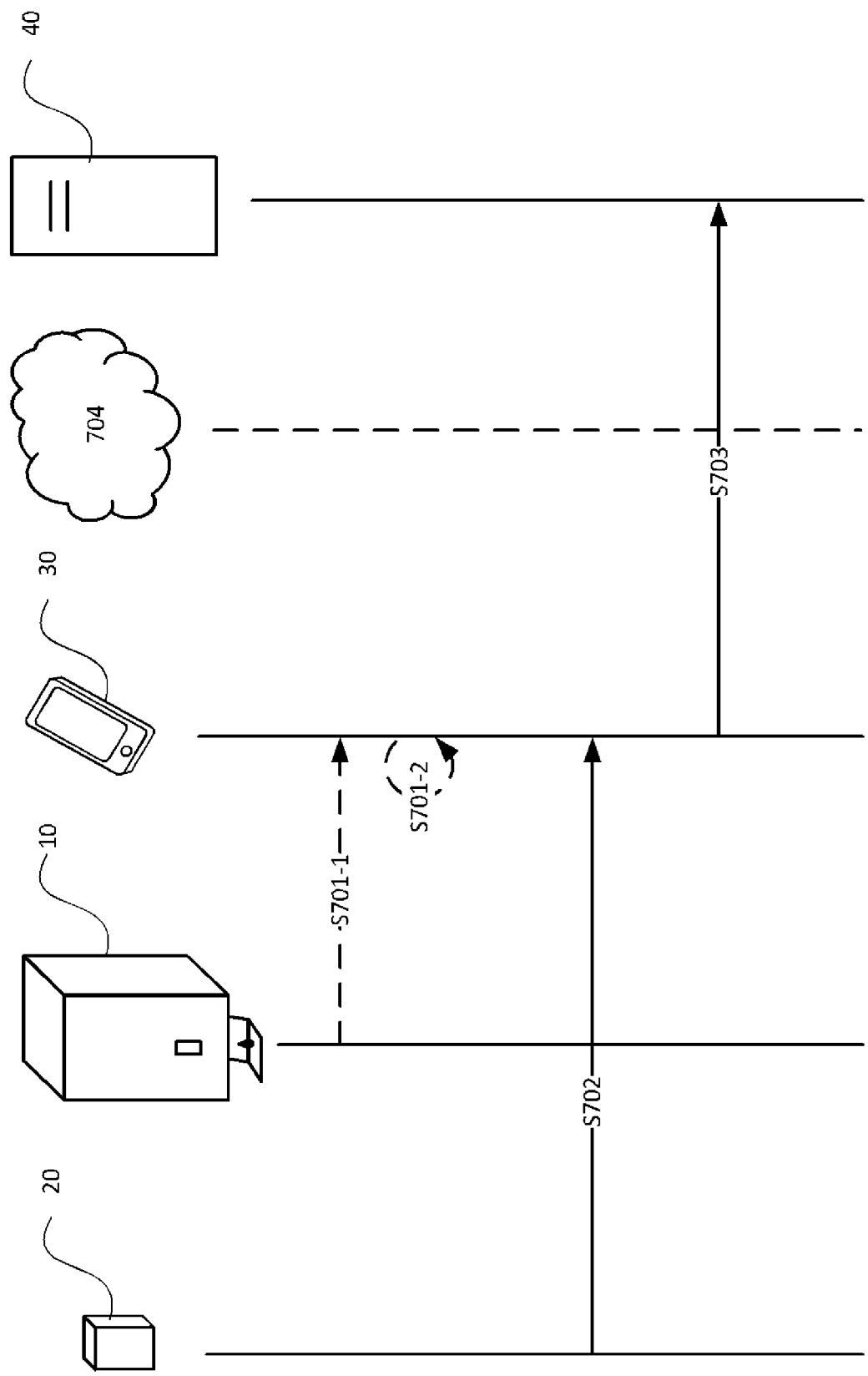
FIG. 7 shows a schematic sequence diagram of an exemplary modus operandi for installing a sensor device, in accordance with an exemplary embodiment herein.

FIG. 6(d) shows screen 600d which is displayed when the user selects the "scan QR code" button 650 in screen 600c. The mobile computing device 30 may be configured to open an imaging application on the mobile computing device 30 and the user may then instruct the mobile computing device 30 to image the QR code 660 by selecting button 665. This process is illustrated in step S702 of FIG. 7.

FIG. 6(e) shows screen 600e which is displayed when process steps S701 and S702 have been completed and the mobile computing device 30 has associated the information indicative of an identification of the sensor device 20 with the information indicative of a location of the piece of hygiene equipment 10. Screen 600e comprises three buttons, namely, a "transmit" button 670, a "store" button 675 and a "store and transmit" button 680. By selecting the "transmit" button 670, the user may instruct the mobile computing device 30 to transmit the information indicative of an identification of the sensor device in combination with the information indicative of a location of the piece of hygiene equipment to a central entity, such as a central server device or a cloud based service. This process is shown in step S703 of FIG. 7, in which the information is transmitted via communication network 704. By selecting the "store" button 675, the user may instruct the mobile computing device 30 to store the information indicative of an identification of the sensor device in combination with the information indicative of a location of the piece of hygiene equipment in a memory section of the mobile computing device 30. By selecting the "store and transmit" button 680, the user may instruct the mobile computing device 30 to perform both actions.

The graphical user interface (GUI) of FIGS. 6(a)-6(e) may, optionally, include any other suitable screen, such as, by way of example, screens allowing the user to instruct the mobile computing device 30 to obtain information indicative of a type of the piece of hygiene equipment 10 and/or information indicative of a type of a consumable (in a case where the piece of hygiene equipment 10 is configured to dispense a consumable to a user) and/or to perform any other additional installation step.

Figure 8:
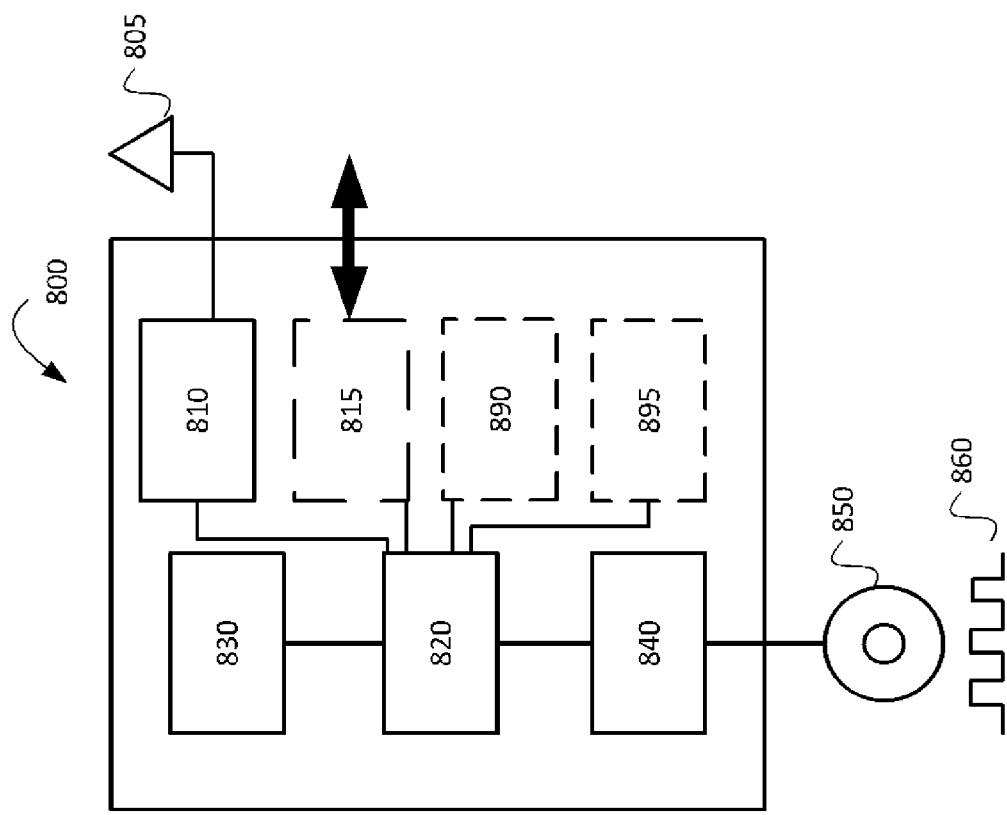
FIG. 8 shows a block diagram illustrating an exemplary hardware configuration of a mobile computing device, in accordance with an exemplary embodiment herein.

FIG. 8 is a block diagram illustrating an exemplary signal processing hardware configuration 800 of the mobile computing device 30, according to an example embodiment herein. The programmable signal processing hardware 800 in FIG. 8 may, as in the present example embodiment, be configured to function as mobile computing device 30. It should be noted, however, that the apparatus 800 may alternatively be implemented in non-programmable hardware, such as an application-specific integrated circuit (ASIC) or in any other suitable manner, using any suitable combination of hardware and software components.

The programmable signal processing hardware 800 comprises a transmitting/receiving section 810 and one or more antennae 805. The signal processing apparatus 800 further comprises a control section 820 (by way of example, a processor, such as a Central Processing Unit, CPU, or Graphics Processing Unit, GPU), a working memory 830 (e.g., a random access memory) and an instruction store 840 storing the computer-readable instructions which, when executed by the control section 820, cause the processor 820 to perform the process steps of any of FIGS. 4(a)-4(c).

The instruction store 840 may comprise a ROM (e.g., in the form of an electrically-erasable programmable read-only memory (EEPROM) or flash memory) which is pre-loaded with the computer-readable instructions. Alternatively, the instruction store 840 may comprise a RAM or similar type of memory, and the computer-readable instructions of the computer program can be input thereto from a computer program product, such as a non-transitory, computer-readable storage medium 850 in the form of a CD-ROM, DVD-ROM, etc., or a computer-readable signal 860 carrying the computer-readable instructions.

Optionally, the programmable signal processing hardware 800 further comprises a communication interface (I/F) 815. In a case where the mobile computing device 30 comprises a display unit (not shown), the communication interface (I/F) 815 outputs display control signals for controlling the display unit. Optionally, the programmable signal processing hardware 800 may further comprise an imaging unit 890 and/or a positioning system 895 (optional components are indicated with dashed lines in FIG. 8).

Figure 9:
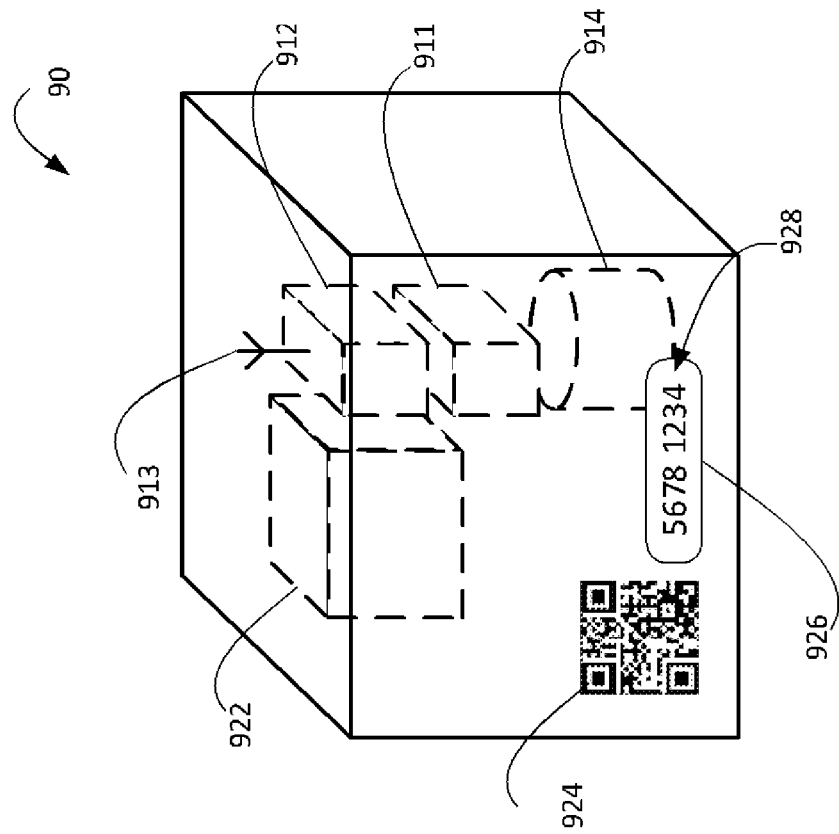
FIG. 9 shows a schematic view of a sensor device in accordance with an exemplary embodiment herein.

FIG. 9 shows a schematic view of a sensor device 90 in accordance with another exemplary embodiment herein. The sensor device 90 comprises the same components as the sensor device 20 of FIG. 2, but differs in function, in that the sensor device 90 is configured to automatically install itself. The sensor device 90 may be implemented by the hardware configuration shown in FIG. 3, or by any other suitable means.

According to the shown embodiment in FIG. 9, the sensor device 90 comprises a sensor 922, a processing circuit 911, a radio circuit 912, and antenna 913, a memory 914, a QR code 924 and a label 926 having an identification number 928 of the sensor device 90 printed thereon. The functional and structural features of each of these elements (and any alternatives) are as described above in relation to corresponding elements of the sensor device 20 of FIG. 2 above, unless specifically stated otherwise.

Figure 10:
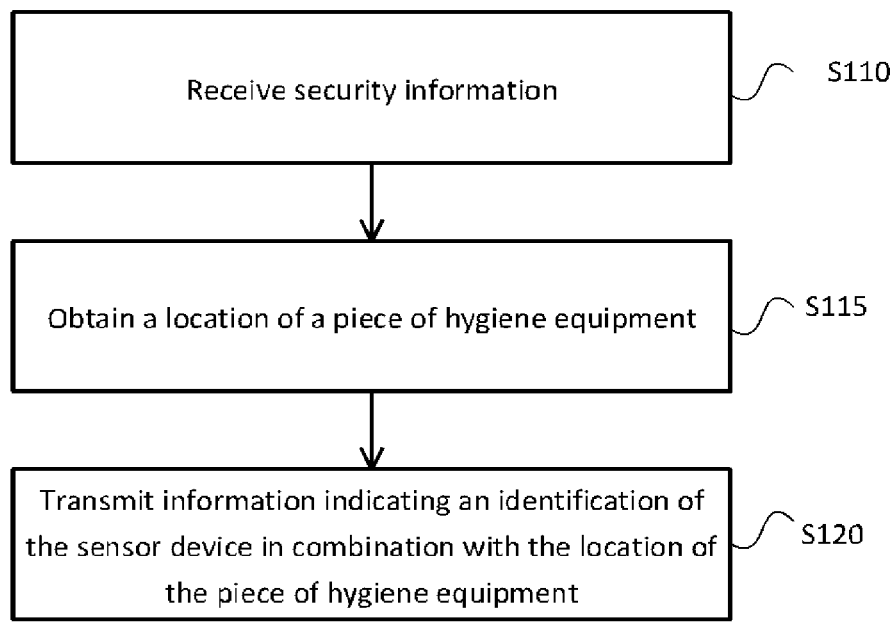
FIG. 10 shows a flow diagram illustrating a process by which the sensor device of FIG. 9 automatically installs itself, in accordance with an exemplary embodiment herein.
Figure 11:
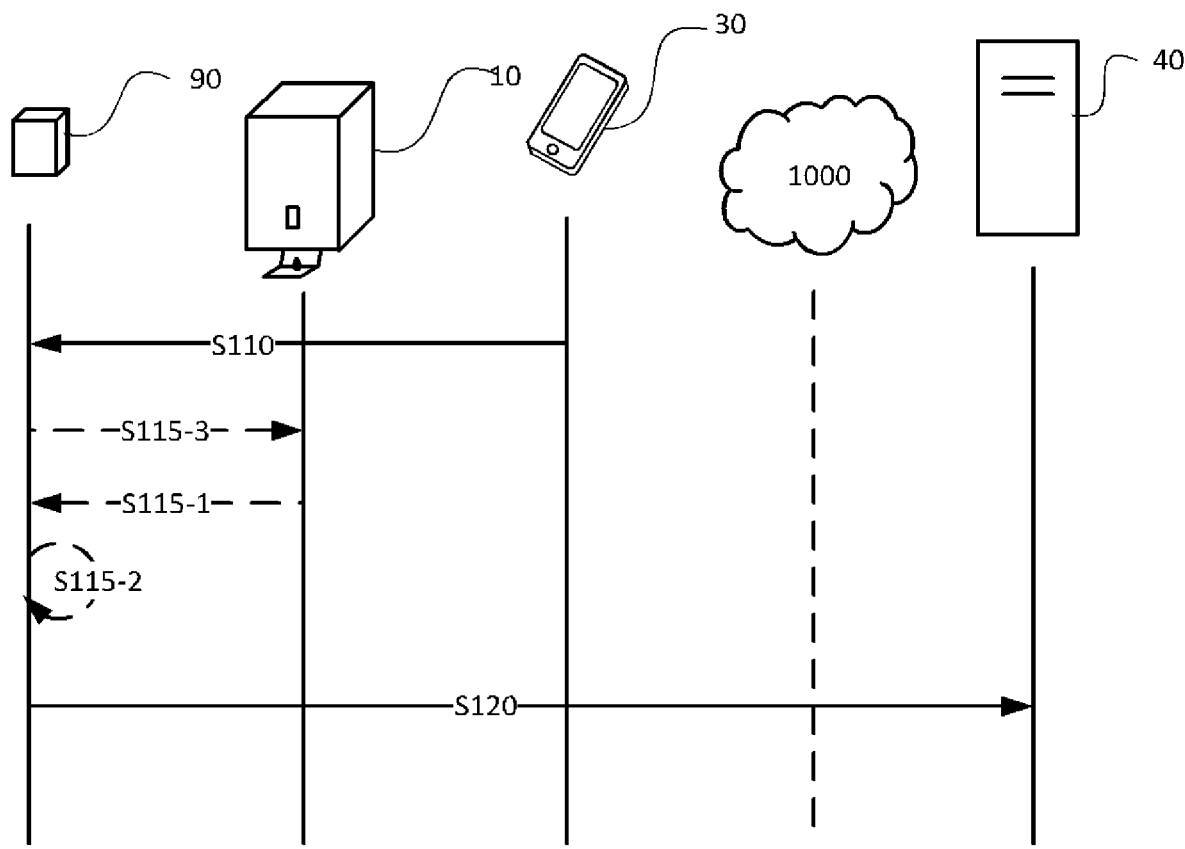
FIG. 11 shows a schematic sequence diagram of the process of FIG. 10 by which the sensor device of FIG. 9 automatically installs itself, in accordance with an exemplary embodiment herein.

FIG. 10 shows a flow diagram illustrating a process by which the sensor device 90 of FIG. 9 automatically installs itself, in accordance with an exemplary embodiment herein. FIG. 11 shows a schematic sequence diagram of the process of FIG. 10 by which the sensor device 90 of FIG. 9 automatically installs itself, in accordance with an exemplary embodiment herein.

In process step S110 of FIG. 10, the sensor device 90 receives, from a mobile computing device 30 (shown in FIG. 11), security information for use in accessing a communication network 1000.

The mobile computing device 30 has the same structural and functional features as a mobile computing device described above in relation to FIGS. 4(*a*) to 4(*c*), 6(*a*) to 6(*e*) and 7, unless specifically described otherwise.

The sensor device 90, an embodiment of which is shown in FIG. 9, may require, as part of installation, authorization to access a communication network in order for the sensor device 90 to operate correctly (for example, transmit data towards a central entity). Therefore, in accordance with an embodiment herein, the sensor device may be configured to receive, from the mobile computing device 30, security information for use in accessing a communication network. The security information may, for example, be a password or a security key. Alternatively, the security information may be a private or public encryption key for use in encrypting data transmitted on the communication network, network credentials for secure communication or any other suitable form of security information. The mobile computing device 30 may be configured to transmit the information by any suitable means known to those versed in the art as discussed above in relation to FIGS. 4(*a*) to 4(*c*), 6(*a*) to 6(*e*) and 7.

In process step S115 of FIG. 10, the sensor device 90 obtains information indicative of a location of a piece of hygiene equipment 10 with which the sensor device 90 is to be associated.

The piece of hygiene equipment 10 is the same as that described above in relation to FIG. 1, unless specifically described otherwise.

The location may, as in the present embodiment, be a room of a building. Alternatively, the location may be, for example, a floor of a building, a cubicle, a particular dispenser of a plurality of dispensers in a room or on a floor, a position of a dispenser in a 3D or 2D coordinate system, etc. The information indicative of a location may comprise the actual location of the piece of hygiene equipment 10 or an indicator that allows the mobile computing device 30 or another device to obtain the location of the piece of hygiene equipment 10 (such as, for example, a pointer to a memory location storing location data, an index in a list of locations, or a key of an array of location data).

The sensor device 90 may, as in the present embodiment, obtain the location by obtaining, from the piece of hygiene equipment 10, information indicative of the location of the piece of hygiene equipment 10. By way of example, the piece of hygiene equipment 10 may be provided with a positioning system (such as a GPS system or an indoor ranging system) or other means of determining its location. In such embodiments, the piece of hygiene equipment 10 may be provided with a means of transmitting information indicative of its location (by way of example, a radio circuit and antenna) which can be received by the sensor device 90. The sensor device 20 may also receive information indicative of the location of the piece of hygiene equipment 10 from the mobile computing device 30 in a similar manner.

Alternatively, by way of further example, the piece of hygiene equipment may be provided with a QR code, barcode, RFID tag and/or NFC tag, from which the information indicative of a location of the piece of hygiene equipment 10 may be read, as described above in relation to process step S15 of FIG. 4(*a*). In such embodiments, the sensor device 90 may comprise an imaging unit or any other means necessary for obtaining the information indicative of the location of the piece of hygiene equipment 10.

By way of alternative, the sensor device 90 may, in a case where the sensor device 90 comprises positioning system (such as, for example, a GPS system or an indoor ranging system), obtain the location by obtaining current position information using the positioning system.

This process is illustrated in optional steps S115-1 and S115-2 of FIG. 11. Step S115-1 illustrates a case in which the sensor device 20 may, optionally, obtain the information indicative of a location of the piece of hygiene equipment 10 by receiving or obtaining information from piece of hygiene equipment 10. By way of example, the sensor device 20 may receive information indicative of a location of the piece of hygiene equipment 10 transmitted by the piece of hygiene equipment 10. Step S115-2 illustrates an alternative case in which the sensor device 20 may, optionally, obtain the information indicative of a location of the piece of hygiene equipment 10 by determining the location itself. By way of example, the sensor device 20 may determine the location using a positioning system provided in the sensor device 20. Additionally, or alternatively, the sensor device 20 may transmit a request for location information to the piece of hygiene equipment 10 as illustrated by step S115-3. By way of further alternative, sensor device 20 may perform two or more of steps S115-1, S115-2 and S115-3 in order to, for example, confirm the location or provide a more accurate location.

In process step S120 of FIG. 10, the sensor device 90 transmits, to a central server device 40 (shown in FIG. 11) via the communication network 1000, information indicative of an identification of the sensor device 90 in combination with the information indicative of a location of the piece of hygiene equipment 10.

The sensor device 90 may, as in the present embodiment, be configured to transmit, to a central server device 40, the information indicative of an identification of the sensor device 90 and the information indicative of a location of the piece of hygiene equipment 10 concurrently. Alternatively, the sensor device 90 may be configured to transmit, to a central server device 40, the information indicative of an identification of the sensor device 90 and the information indicative of a location of the piece of hygiene equipment 10 separately. By way of example, the sensor device 90 may be configured to first transmit, to a central server device 40, the information indicative of an identification of the sensor device 90 and to subsequently transmit, to the central server device, the information indicative of a location of the piece of hygiene equipment 10 in combination with some information that allows the central server device 40 to correctly associate the information indicative of a location of the piece of hygiene equipment 10 with the previously received information indicative of an identification of the sensor device 90.

In the embodiment of FIG. 11, the sensor device 90 transmits the information directly to a central server device 40. Alternatively, the sensor devices 90 may transmit data via one or more gateways, localized in the building in which the sensor device 90 and piece of hygiene equipment 10 are to be installed. The gateway(s) may be configured to forward the data received from the sensor device 90 in the building to the central server device 40 via network 1000.

The sensor device 90 may be configured to transmit the information by any suitable means known to those versed in the art. For example, the sensor device 90 may transmit information via a direct communication link (which may be provided by any suitable wireless connection, e.g., a Bluetooth™ connection), or an indirect communication link (which may be provided by a network comprising a Local Area Network (LAN), a Wide Area Network (WAN) and/or the Internet). The sensor device 90 may comprise processing and communication functionalities necessary to operate in accordance with one or more conventional telecommunication standards, including—but not limited to—GSM, PCS, 3GPP, LTE, LTE-A, UMTS, 3G, 4G, 5G.

In embodiments in which the sensor device 90 is configured to transmit data via one or more gateways, the one or more gateways may, additionally, be configured to transmit the information by any suitable means as described above.

As is apparent from the preceding description, the sensor device 90 is configured to transmit, to a central server device 40, information indicative of an identification of the sensor device 90 in combination with the information indicative of a location of the piece of hygiene equipment 10. Accordingly, in a case where the sensor device 90 subsequently transmits, to a central server device, data including information on, for example, the necessity of a maintenance action, the central server device 40 will be able to determine the location of the piece of hygiene equipment 10 based on the information on an identification of the sensor device 90, or vice versa. As a result, the central server device can generate guiding information that tells service personnel that a specific piece of hygiene equipment 10, located at a specific position (e.g., room number, floor number, 3D-coordinates, and the like) requires a maintenance action, for example, a refill. That is, the sensor is set up and configured for correct operation (installed).

Additionally, it may be advantageous to transmit, with the information indicative of an identification of the sensor device 90 with the information indicative of a location of the piece of hygiene equipment 10, information indicative of a type of the piece of hygiene equipment 10 and/or information indicative of a type of the consumable. This may be particularly advantageous in embodiments such as the present embodiment in which the sensor device 90 is configured to sense a filling state of the consumable in the reservoir 103. Accordingly, in a case where the sensor device 90 transmits to a central entity information indicating that a maintenance action, such as a refill of a consumable stored in reservoir 103, is necessary, the central entity determine, for example, the type of a consumable, a volume or amount of the consumable, a particular tool for use with that type of piece of hygiene equipment, etc., that a service person should bring.

Therefore, the process of FIG. 10 may optionally further comprise the sensor device 90 performing the steps of obtaining, from the piece of hygiene equipment 10, information indicative of a type of the piece of hygiene equipment 10 and transmitting, to a central server device via the communication network 1000, the information indicative of the type of the piece of hygiene equipment 10. The information indicative of a type of the piece of hygiene equipment 10 may indicate, by way of example, a function of the piece of hygiene equipment 10 (e.g., whether it is a soap dispenser or a used towel bin, etc.), a model of the piece of hygiene equipment 10, a size of the piece of hygiene equipment 10, etc.

Additionally or alternatively, the process of FIG. 10 may optionally comprise the sensor device 90 performing the steps of obtaining, from the piece of hygiene equipment 10, information indicative of a type of the consumable and transmitting, to a central server device via the communication network 1000, the information indicative of the type of the consumable. In this case, it is assumed that the piece of hygiene equipment 10 is configured to dispense a consumable to a user.

The sensor device 90 may obtain the information indicative of a type of the piece of hygiene equipment 10 and/or information indicative of a type of the consumable from the piece of hygiene equipment 10 by any means described above in relation to process step S115 of FIG. 10.

Although detailed embodiments have been described, these only serve to provide a better understanding of the invention defined by the independent claims, and are not to be seen as limiting.

What is claimed is:

1. A method, for a mobile computing device, of installing a sensor device at a location of a piece of hygiene equipment, the method comprising:
    obtaining by the mobile computing device at the location of the piece of hygiene equipment directly from the sensor device, information indicative of an identification of the sensor device;
    obtaining by the mobile computing device at the location of the piece of hygiene equipment, information delivered directly from the sensor indicative of the location of the piece of hygiene equipment with which the sensor device is to be associated; and
    associating the information indicative of an identification of the sensor device with the information indicative of the location of the piece of hygiene equipment.

2. The method of claim 1, further comprising:
    obtaining by the mobile computing device at the location of the piece of hygiene equipment, information indicative of a type of the piece of hygiene equipment from the piece of hygiene equipment; and
    associating the information indicative of the type of the piece of hygiene equipment with the information indicative of an identification of the sensor device and the information indicative of the location of the piece of hygiene equipment.

3. The method of claim 1, wherein the piece of hygiene equipment is configured to dispense a consumable to a user, and the method further comprises:
    obtaining information indicative of a type of the consumable; and associating the information indicative of the type of the consumable with the information indicative of an identification of the sensor device and the information indicative of the location of the piece of hygiene equipment.

4. The method of claim 1, further comprising storing the associated information.

5. The method of claim 1, further comprising transmitting the associated information from the mobile computing device to a central server device.

6. The method of claim 1, wherein the step of obtaining the information indicative of the location of the piece of hygiene equipment and the step of associating the information indicative of an identification of the sensor device with the information indicative of the location of the piece of hygiene equipment are automatically performed, by the mobile computing device, in response to completion of the step of obtaining the information indicative of an identification of the sensor device.

7. The method of claim 1, wherein the information indicative of an identification of the sensor device is obtained by the mobile computing device, at the location of the piece of hygiene equipment, from the sensor device by any one of:
 machine-reading information indicative of an identification of the sensor device provided on a surface of the sensor device or provided on a label of the sensor device;
 scanning at least one of a QR code, a barcode, an RFID tag and a NFC tag, provided on the sensor device and containing information indicative of an identification of the sensor device; and
 receiving information indicative of an identification of the sensor device transmitted by the sensor device.

8. The method of claim 1, wherein the information indicative of the location of the piece of hygiene equipment with which the sensor device is to be associated is obtained at the location of the piece of hygiene equipment by the mobile computing device any one of the following:
 obtaining information indicative of the location of the piece of hygiene equipment from a positioning system of the mobile computing device;
 receiving input from the user of the mobile computing device via an input unit of the mobile computing device;
 scanning at least one of a QR code, a barcode, an RFID tag and a NFC tag, provided on the piece of hygiene equipment and containing information indicative of the location of the piece of hygiene equipment; and
 receiving information indicative of the location of the piece of hygiene equipment transmitted by the piece of hygiene equipment.

9. The method of claim 1, further comprising installing at least one additional sensor device.

10. The method of claim 1, further comprising performing at least one test to determine if the sensor device is correctly installed.

11. The method of claim 1, further comprising transmitting, to the sensor device, security information for use in accessing a communication network.

12. A non-transitory computer readable medium comprising a computer program with instructions, when executed by a processor included in a mobile computing device, cause the mobile computing device to perform the method of claim 1.

13. A non-transitory computer readable medium comprising an application, downloadable from a data repository, when executed by a processor included in a mobile computing device, cause the mobile computing device to perform the method of claim 1.

14. A mobile computing device, comprising:
 a radio circuit;
 a processor at a location of a piece of hygiene equipment; and
 a memory,
 wherein the memory is configured to store instructions which, when executed by the processor, cause the processor to:
  obtain, directly from a sensor device at the location of the piece of hygiene equipment, information indicative of an identification of the sensor device;
  obtain directly from the sensor device, information indicative of the location of the piece of hygiene equipment with which the sensor device is to be associated; and
  associate the information indicative of an identification of the sensor device with the information indicative of the location of the piece of hygiene equipment.

15. The mobile computing device of claim 14, wherein the memory is further configured to store instructions which, when executed by the processor, cause the processor to:
 obtain, from the piece of hygiene equipment, information indicative of a type of the piece of hygiene equipment; and
 associate the information indicative of the type of the piece of hygiene equipment with the information indicative of an identification of the sensor device at the location of the piece of hygiene equipment and the information indicative of the location of the piece of hygiene equipment.

16. The mobile computing device of claim 14, wherein the memory is further configured to store instructions which, when executed by the processor, cause the processor to:
 obtain, from the piece of hygiene equipment, information indicative of a type of a consumable dispensed by the piece of hygiene equipment; and
 associate the information indicative of the type of the consumable with the information indicative of an identification of the sensor device and the information indicative of the location of the piece of hygiene equipment.

17. The mobile computing device of claim 14, wherein the memory is further configured to store instructions which, when executed by the processor, cause the processor to store the associated information in the memory.

18. The mobile computing device of claim 14, wherein the memory is further configured to store instructions which, when executed by the processor, cause the processor to transmit the associated information from the mobile computing device at the location of the piece of hygiene equipment to a central server device.

19. The mobile computing device of claim 14, wherein the memory is further configured to store instructions which, when executed by the processor, cause the processor to automatically perform, in response to completion of the step of obtaining the information indicative of an identification of the sensor device, the process of obtaining the information indicative of the location of the piece of hygiene equipment and the process of associating the information indicative of an identification of the sensor device with the information indicative of the location of the piece of hygiene equipment.

20. The mobile computing device of claim 14, wherein:
 the mobile computing device further comprises an imaging unit; and the memory is further configured to store instructions which, when executed by the processor, cause the processor at the location of the piece of hygiene equipment to obtain directly from the sensor device the information indicative of an identification of the sensor device by any one of:
- machine-reading information indicative of an identification of the sensor device provided on a surface of the sensor device or provided on a label the sensor device;
- scanning at least one of a QR code, a barcode, an RFID tag and a NFC tag, provided on the sensor device at the location of the piece of hygiene equipment and containing information indicative of an identification of the sensor device at the location of the piece of hygiene equipment; and
- receiving information indicative of an identification of the sensor device transmitted by the sensor device at the location of the piece of hygiene equipment.

21. The mobile computing device of claim 14, wherein:
the mobile computing device further comprises a positioning system, an imaging unit and an input unit; and
the memory is further configured to store instructions which, when executed by the processor, cause the processor at the location of the piece of hygiene equipment to obtain the information indicative of the location of the piece of hygiene equipment with which the sensor device at the location of the piece of hygiene equipment is to be associated by any one of the following:
- obtaining information indicative of the location of the piece of hygiene equipment from a positioning system of the mobile computing device;
- receiving input from the user of the mobile computing device via an input unit of the mobile computing device;
- scanning at least one of a QR code, a barcode, an RFID tag and a NFC tag, provided on the piece of hygiene equipment and containing information indicative of the location of the piece of hygiene equipment; and
- receiving information indicative of the location of the piece of hygiene equipment transmitted by the piece of hygiene equipment.

22. The mobile computing device of claim 14, wherein the memory of the mobile computing device is further configured to store instructions which, when executed by the processor, cause the processor to, perform at least one test to determine if the sensor device at the location of the piece of hygiene equipment is correctly installed.

23. The mobile computing device of claim 14, wherein the memory is further configured to store instructions which, when executed by the processor, cause the processor to transmit, to the sensor device at the location of the piece of hygiene equipment, security information for use in accessing a communication network.

24. A method of automatically installing a sensor device at a location of a piece of hygiene equipment, the method comprising the following steps performed by the sensor device:
- receiving, by the sensor device, security information directly from a mobile computing device at the location of the piece of hygiene equipment, the security information configured for use in accessing a communication network;
- obtaining, by the sensor device, information delivered directly from the piece of hygiene equipment that is indicative of the location of the piece of hygiene equipment with which the sensor device is to be associated; and
- transmitting, by the sensor device to a central server device via the communication network, information indicative of an identification of the sensor device in combination with the information indicative of the location of the piece of hygiene equipment.

25. The method of claim 24, further comprising:
- obtaining, from the piece of hygiene equipment, information indicative of a type of the piece of hygiene equipment; and
- transmitting, to a central server device via the communication network, the information indicative of the type of the piece of hygiene equipment.

26. The method of claim 24, wherein the piece of hygiene equipment is configured to dispense a consumable to a user and the method further comprises:
- obtaining, from the piece of hygiene equipment, information indicative of a type of the consumable; and
- transmitting, to a central server device via the communication network, the information indicative of the type of the consumable.

27. The method of claim 24, further comprising storing the associated information.

28. The method of claim 24, wherein the step of obtaining information indicative of the location of the piece of hygiene equipment with which the sensor device is to be associated and the step of transmitting, to a central server device via the communication network, information indicative of an identification of the sensor device in combination with the information indicative of the location of the piece of hygiene equipment are automatically performed in response to completion of the step of receiving, from a mobile computing device at the location of the piece of hygiene equipment, security information for use in accessing a communication network.

29. The method of claim 24, wherein the information indicative of the location of the piece of hygiene equipment with which the sensor device is to be associated is obtained by any one of the following:
- obtaining information indicative of the location of the piece of hygiene equipment from a positioning system of the sensor;
- receiving information indicative of the location of the piece of hygiene equipment from the mobile computing device at the location of the piece of hygiene equipment;
- scanning at least one of a QR code, a barcode, an RFID tag and a NFC tag, provided on the piece of hygiene equipment and containing information indicative of the location of the piece of hygiene equipment; and
- receiving information indicative of the location of the piece of hygiene equipment transmitted by the piece of hygiene equipment.

30. A sensor device, comprising:
a sensor;
a radio circuit;
a processor; and
a memory,
wherein the memory is configured to store instructions which, when executed by the processor, cause the processor to:
- receive, by the sensor device at a location of a piece of hygiene equipment, security information directly from a mobile computing device at the location of the piece of hygiene equipment, the security information configured for use in accessing a communication network;
obtain, by the sensor device, information delivered directly from the piece of hygiene equipment that is indicative of the location of the piece of hygiene equipment with which the sensor device is to be associated; and
transmit, by the sensor device to a central server device via the communication network, information indicative of an identification of the sensor device in combination with the information indicative of the location of the piece of hygiene equipment.

31. The sensor device of claim 30, wherein the memory is further configured to store instructions which, when executed by the processor, cause the processor to:
obtain, from the piece of hygiene equipment, information indicative of a type of the piece of hygiene equipment; and
associate the information indicative of the type of the piece of hygiene equipment with the information indicative of an identification of the sensor device and the information indicative of the location of the piece of hygiene equipment.

32. The sensor device of claim 30, wherein the memory is further configured to store instructions which, when executed by the processor, cause the processor to:
obtain, from the piece of hygiene equipment, information indicative of a type of a consumable dispensed by the piece of hygiene equipment; and
associate the information indicative of the type of the consumable with the information indicative of an identification of the sensor device and the information indicative of the location of the piece of hygiene equipment.

33. The sensor device claim 30, wherein the memory is further configured to store instructions which, when executed by the processor, cause the processor to store the associated information in the memory.

34. The sensor device of claim 30, wherein the memory is further configured to store instructions which, when executed by the processor, cause the processor to automatically perform, in response to completion of the process of receiving, from a mobile computing device at the location of the piece of hygiene equipment, security information for use in accessing a communication network, the process of obtaining information indicative of the location of the piece of hygiene equipment with which the sensor device is to be associated and the step of transmitting, to a central server device via the communication network, information indicative of an identification of the sensor device in combination with the information indicative of the location of the piece of hygiene equipment.

35. The sensor device of claim 30, wherein:
the sensor device further comprises a positioning system and an imaging unit; and
the memory is further configured to store instructions which, when executed by the processor, cause the processor to obtain the information indicative of the location of the piece of hygiene equipment with which the sensor device is to be associated by any one of the following:
obtaining information indicative of the location of the piece of hygiene equipment from a positioning system of the sensor device;
receiving information indicative of the location of the piece of hygiene equipment from the mobile computing device at the location of the piece of hygiene equipment;
scanning at least one of a QR code, a barcode, an RFID tag and a NFC tag, provided on the piece of hygiene equipment and containing information indicative of the location of the piece of hygiene equipment; and
receiving information indicative of the location of the piece of hygiene equipment transmitted by the piece of hygiene equipment.

\* \* \* \* \*

(12) SUPPLEMENTAL EXAMINATION CERTIFICATE

United States Patent
Nordin et al.

(10) Number: US 11,871,322 F1
(45) Certificate Issued: Jul. 17, 2024

Control No.: 96/050,042

Filing Date: Jun. 18, 2024

Primary Examiner: Jeffrey D. Carlson

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2016/0127900 | 5/2016 | Archibald et al. |
| 2009/0195385 | 8/2009 | Huang et al. |